(12) United States Patent
Era

(10) Patent No.: US 8,325,219 B2
(45) Date of Patent: Dec. 4, 2012

(54) STEREOSCOPIC IMAGE GENERATION DEVICE AND PROGRAM

(76) Inventor: Kazunari Era, Kashiwa (JP)

( * ) Notice: Subject to any disclaimer, the term of this patent is extended or adjusted under 35 U.S.C. 154(b) by 1366 days.

(21) Appl. No.: 11/919,922

(22) PCT Filed: May 9, 2006

(86) PCT No.: PCT/JP2006/309331
§ 371 (c)(1),
(2), (4) Date: Nov. 6, 2007

(87) PCT Pub. No.: WO2006/121050
PCT Pub. Date: Nov. 16, 2006

(65) Prior Publication Data
US 2009/0310935 A1   Dec. 17, 2009

(30) Foreign Application Priority Data

May 10, 2005   (JP) ................................. 2005-137709

(51) Int. Cl.
*H04N 13/00* (2006.01)
*H04N 13/04* (2006.01)
(52) U.S. Cl. ............................................ 348/42; 348/51
(58) Field of Classification Search .................... 348/42, 348/51
See application file for complete search history.

(56) References Cited

U.S. PATENT DOCUMENTS

| 6,525,699 B1* | 2/2003 | Suyama et al. ..................... 345/6 |
| 6,798,410 B1* | 9/2004 | Redshaw et al. ............... 345/427 |
| 6,816,158 B1* | 11/2004 | Lemelson et al. ............. 345/419 |
| 7,557,824 B2* | 7/2009 | Holliman .......................... 348/46 |
| 2002/0113752 A1* | 8/2002 | Sullivan et al. .................... 345/6 |
| 2003/0091225 A1* | 5/2003 | Chen .............................. 382/145 |
| 2005/0089212 A1* | 4/2005 | Mashitani et al. ............. 382/154 |
| 2007/0291110 A1* | 12/2007 | Era ................................. 348/42 |

FOREIGN PATENT DOCUMENTS

| JP | A 2000-78611 | 3/2000 |
| JP | A 2002-123842 | 4/2002 |
| JP | A 2004-166195 | 6/2004 |
| JP | A 2004-248213 | 9/2004 |

* cited by examiner

*Primary Examiner* — Minh-Chau Nguyen
(74) *Attorney, Agent, or Firm* — Oliff & Berridge, PLC

(57) ABSTRACT

In a stereoscopic image generation device according to the invention, an obtaining means 11 obtains sequentially a plurality of original images Ga arranged in a time line and forming a content item. A calculation means 12 calculates an image characteristic value Ng from pixel values of a plurality of pixels included in an original image Ga obtained by the obtaining means 11. A storage device 21 stores a project file Fp by which image characteristic values Nf for the original images Ga forming the content item are respectively associated with stereoscopic parameters for generating stereoscopic images Gb from the original images Ga. A retrieval means 13 compares an image characteristic value calculated by the calculation means 12 from a particular original image Ga, with each of the image characteristic values Nf stored in the storage device 21, to retrieve a stereoscopic parameter for the particular original image Ga on the basis of a comparison result. A stereoscopic imaging means 14 generates a stereoscopic image Gb from each original image Ga, based on the stereoscopic parameter retrieved by the retrieval means 13.

14 Claims, 12 Drawing Sheets

↓ AVERAGING(STEP_{Sa2})

↓ QUANTIZATION(STEP_{Sa3})

↓ RANGE LIMITING(STEP_{Sa4})

FIG. 4
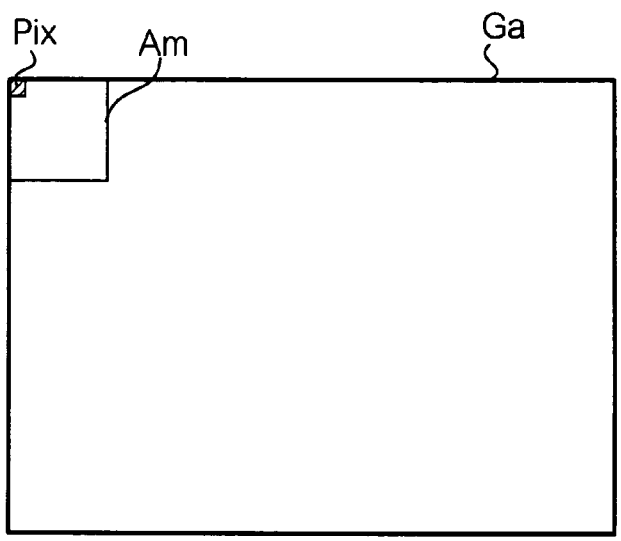
FIG. 5
| IMAGE IDENTIFIER | IMAGE CHARACTERISTIC VALUE Nf | PARAMETER GROUP P | | | |
|---|---|---|---|---|---|
| | | Sm | Ob | Dc | ... |
| 0001 | 1342 | 23 | 124 | 51 | ... |
| 0002 | 345 | 37 | 152 | 52 | ... |
| 0003 | 2987 | 29 | 89 | 48 | ... |
| ⋮ | ⋮ | ⋮ | ⋮ | ⋮ | ... |
FIG. 6
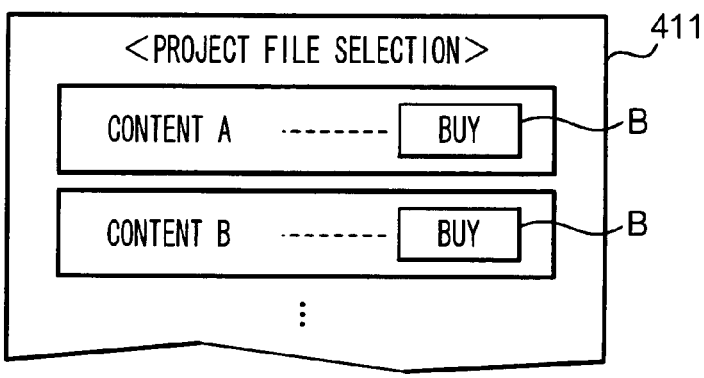

| IMAGE IDENTIFIER | IMAGE CHARACTERISTIC VALUE Nf | PARAMETER GROUP P | |
|---|---|---|---|
| ⋮ | ⋮ | ⋮ | |
| 0053 | 845 | ~ | } R |
| 0054 | 643 | ~ | |
| 0055 | 1524 | ~ | |
| ⋮ | ⋮ | ⋮ | |
| 0078 | 845 | ~ | |
| 0079 | 238 | ~ | |
| 0080 | 792 | ~ | |
| ⋮ | ⋮ | ⋮ | |

| IMAGE IDENTIFIER | AREA NUMBER | IMAGE CHARACTERISTIC VALUE Nf | PARAMETER GROUP P | | |
|---|---|---|---|---|---|
| | | | Sm | Ob | ... |
| 0001 | 01 | 1342 | 23 | 124 | ... |
| | 02 | 345 | | | |
| | ⋮ | ⋮ | | | |
| | 06 | 2987 | | | |
| 0002 | 01 | 345 | 45 | 98 | ... |
| | 02 | 3257 | | | |
| | ⋮ | ⋮ | | | |
| | 06 | 784 | | | |
| ⋮ | ⋮ | ⋮ | ⋮ | ⋮ | ⋮ |

FIG. 13
| IMAGE IDENTIFIER | AREA NUMBER | IMAGE CHARACTERISTIC VALUE Nf | PARAMETER GROUP P | | |
|---|---|---|---|---|---|
| | | | Sm | Ob | ... |
| 0001 | 01 | 1342 | 23 | 124 | ... |
| | 02 | 345 | 37 | 152 | ... |
| | ⋮ | ⋮ | ⋮ | ⋮ | ... |
| | 06 | 2987 | 27 | 184 | ... |
| 0002 | 01 | 345 | 45 | 98 | ... |
| | 02 | 3257 | 75 | 173 | ... |
| | ⋮ | ⋮ | ⋮ | ⋮ | ... |
| | 06 | 784 | 63 | 149 | ... |
| ⋮ | ⋮ | ⋮ | ⋮ | ⋮ | ⋮ |
Fp
R
FIG. 14
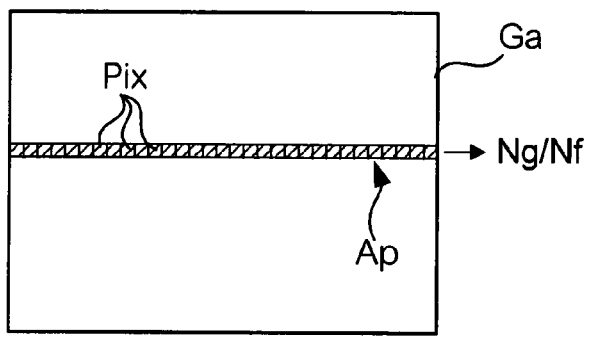
FIG. 15
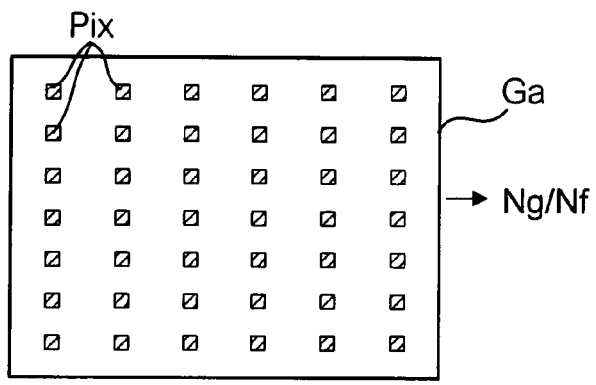

| IMAGE IDENTIFIER | AREA NUMBER | IMAGE CHARACTERISTIC VALUE Nf (RELATIVE VALUE) | PARAMETER GROUP P | | |
|---|---|---|---|---|---|
| | | | Sm | Ob | ... |
| 0001 | 01 | 1 | 23 | 124 | ... |
| | 02 | 0.257 | | | |
| | ⋮ | ⋮ | | | |
| | 06 | 2.226 | | | |
| 0002 | 01 | 1 | 45 | 98 | ... |
| | 02 | 9.440 | | | |
| | ⋮ | ⋮ | | | |
| | 06 | 2.272 | | | |
| ⋮ | ⋮ | ⋮ | ⋮ | ⋮ | ⋮ |

Fp (top right), R (right bracket spanning first image rows)

| GROUP IDENTIFIER | IMAGE IDENTIFIER | IMAGE CHARACTERISTIC VALUE Nf | PARAMETER GROUP P | | |
| --- | --- | --- | --- | --- | --- |
| | | | Sm | Ob | ... |
| 0001 | 0001 | 1342 | 23 | 124 | ... |
| | 0002 | 345 | 37 | 152 | ... |
| | 0003 | 2987 | 29 | 89 | ... |
| | ⋮ | ⋮ | ⋮ | ⋮ | ... |
| 0002 | 0035 | 345 | 45 | 98 | ... |
| | 0036 | 3257 | 75 | 173 | ... |
| | 0037 | 784 | 63 | 149 | ... |
| | ⋮ | ⋮ | ⋮ | ⋮ | ... |
| ⋮ | ⋮ | ⋮ | ⋮ | ⋮ | ⋮ |

| GROUP IDENTIFIER | IMAGE IDENTIFIER | IMAGE CHARACTERISTIC VALUE Nf | PARAMETER GROUP P |
|---|---|---|---|
| ⋮ | ⋮ | ⋮ | ⋮ |
| 010 | 0053 | 845 | ~ |
| | 0054 | 671 | ~ |
| | ⋮ | ⋮ | ⋮ |
| | 0082 | 934 | ~ |
| ⋮ | ⋮ | ⋮ | ⋮ |
| 013 | 0160 | 845 | ~ |
| | 0161 | 236 | ~ |
| | ⋮ | ⋮ | ⋮ |
| | 0198 | 1327 | ~ |
| ⋮ | ⋮ | ⋮ | ⋮ |

FIG. 22

| IMAGE IDENTIFIER | SUBJECT NUMBER Oi | IMAGE CHARACTERISTIC VALUE N | PARAMETER GROUP Pi | | |
|---|---|---|---|---|---|
| | | | Sm | Ob | ... |
| 0001 | 01 | 1342 | 23 | 124 | ... |
| | 02 | 345 | 37 | 152 | ... |
| | ⋮ | ⋮ | ⋮ | ⋮ | ... |
| | 06 | 2987 | 29 | 89 | ... |
| 0002 | 01 | 345 | 45 | 98 | ... |
| | 02 | 3257 | 75 | 173 | ... |
| | ⋮ | ⋮ | ⋮ | ⋮ | ... |
| | 06 | 784 | 63 | 149 | ... |
| ⋮ | ⋮ | ⋮ | ⋮ | ⋮ | ⋮ |

FIG. 23

| IMAGE IDENTIFIER | IMAGE CHARACTERISTIC CLASS GN | PARAMETER GROUP P | | | |
|---|---|---|---|---|---|
| | | Sm | Ob | Dc | ... |
| 0001 | 134 | 23 | 124 | 51 | ... |
| 0002 | 34 | 37 | 152 | 52 | ... |
| 0003 | 299 | 29 | 89 | 48 | ... |
| ⋮ | ⋮ | ⋮ | ⋮ | ⋮ | ... |

STEREOSCOPIC IMAGE GENERATION DEVICE AND PROGRAM

BACKGROUND

1. Technical Field

The present invention relates to a technique for generating an image which is perceived as a three-dimensional image by an observer.

2. Related Art

Two images having a parallax in between can be perceived as a single three-dimensional image when an observer sees the images with the left eye focused on one of the two images and the right eye on the other image. There have been proposed techniques for generating a pair of images having such a parallax in between (the pair hereinafter referred to as one "stereoscopic image") from a plane image (for example, see Patent Document 1). According to those techniques, a stereoscopic image is generated by performing a predetermined processing (hereinafter "stereoscopic processing") on a plane image, based on various parameters such as a depth, etc., which are sensed by an observer (hereinafter "stereoscopic parameters"). The techniques can be applied to a case of reproducing a moving picture in which plural images are arranged sequentially in a time line. That is, if stereoscopic images are sequentially generated from respective images forming a moving picture, a motion picture can be reproduced with a three-dimensional impression.

[Patent Document 1]
JP-A 2002-123842 (paragraph 0033 and FIG. 7)

SUMMARY

The positions and depth sizes of objects included in images are different between the images. Therefore, stereoscopic parameters used for generating a stereoscopic image should desirably be selected individually for each plane image, depending on a content of the plane image from which a stereoscopic image is generated. There is often a case of producing a recording medium such as a DVD (Digital Versatile Disk) which contains various content items such as cinemas, etc. In a method expected to be used for this case, stereoscopic parameters are selected in advance for each of the images forming a content item, and are stored in the recording medium in advance as well, with the stereoscopic parameters associated with corresponding images. When playing back the recording medium, stereoscopic images are sequentially generated from respective images forming the content item, based on the stereoscopic parameters. Then, users can experience natural three-dimensional impressions optimally matched with content of the respective images.

With this method, however, the content items reproducible as stereoscopic images are only such content items that were stored together with associated stereoscopic parameters at the time of producing a recording medium (when the content items were written into a recording medium). Naturally, stereoscopic parameters are not recorded on traditional packaged recording media which are produced supposing only a situation of reproducing the content items as plane images. Such content items can therefore not be reproduced as stereoscopic images. As a countermeasure for this problem, there can be considered a way to separately supply stereoscopic parameters which are set for each of the images forming a content item, and to reproduce the content item, based on the stereoscopic parameters. Even in this case, however, images forming a content item cannot always be associated with stereoscopic parameters set for the images. As a result, stereoscopic images cannot be properly generated in some cases. That is, only in case of sequentially reproducing images forming a content item from the first one of the images in an order in which the images are arranged, optimal stereoscopic images can be reproduced by picking up and applying the stereoscopic parameters sequentially in the order of the images arranged. However, if a user makes a manipulation (such as fast-forwarding or rewinding) to change a start point where reproduction of the content items start, stereoscopic parameters can no longer be correctly specified for images after changing the start point. As a consequence, there is a problem that the content items recorded on traditional packaged recording media are difficult to reproduce as proper stereoscopic images because the recording media are produced with the object of reproducing the content items only as plane images.

The present invention has been made in view of circumstances described above, and is directed to reproducing natural stereoscopic images by applying optimal stereoscopic parameters to images even in case of reproducing a content item which is not related to stereoscopic parameters.

To address problems described above, a stereoscopic image generation device according to an aspect of the present invention includes: an obtaining means that obtains sequentially a plurality of original images arranged in a time line and forming a content item; a calculation means that calculates a first image characteristic value from pixel values of a plurality of pixels included in one of the plurality of original images obtained by the obtaining means; a storage means that stores second image characteristic values for the plurality of original images and stereoscopic parameters for generating stereoscopic images from the original images, with the second image characteristic values respectively associated with stereoscopic parameters; a retrieval means that compares a first image characteristic value calculated by the calculation means from a particular original image, with each of the second image characteristic values stored in the storage means, to retrieve a stereoscopic parameter for the particular original image, based on a comparison result; and a stereoscopic imaging means that generates a stereoscopic image from the particular original image, based on the stereoscopic parameter retrieved by the retrieval means.

According to the configuration described above, second image characteristic values of original images forming a content item and stereoscopic parameters generated from the original images are stored in the storage means, with the second image characteristic values and the stereoscopic parameters associated with each other. On the other hand, a stereoscopic parameter can be retrieved, based on a result of comparing a first image characteristic value of a particular original image included in a content item obtained by the obtaining means, with the second image characteristic values stored in the storage means. Therefore, even if the original images forming the content item to be reproduced are not associated with stereoscopic parameters in advance, optimal stereoscopic parameters can be applied respectively to the original images of the content item. Accordingly, natural stereoscopic images can be generated.

In the invention, the "pixel value" is a numerical value indicating a content (such as a gradation step or luminance) displayed by one pixel. In case of a color image expressed by plural colors (e.g., red, green, and blue), various values such as chromes and brightness indicating a color tone are set as pixel values for each of the plural colors. Also in the invention, each "image characteristic value" is defined as a numerical value calculated from pixel values of plural pixels included in each of the original images forming a content item. The image characteristic value can be calculated from pixels by an arbitrary method. For example, in an available configuration, an image characteristic value is calculated by summing up pixel values of plural pixels, or by substituting pixel values of plural pixels into a predetermined function. Plural pixels which base a calculation of an image characteristic value can be appropriately selected from each original image forming a content item. More specifically, in an available configuration, an image characteristic value can be calculated from pixel values of all pixels in each of the original images forming a content item, or can be selected from pixel values of plural pixels appropriately selected from each of the original images forming a content item. For example, a first image characteristic value is calculated from plural pixels belonging to a particular area in each of the original images forming a content item (e.g., a particular row or column of pixels among plural pixels arrayed in a matrix). A further available configuration is that one original image is divided into areas and a first image characteristic value is calculated for each of the areas, from pixel values of pixels belonging to a corresponding one of the areas. In this case, the storage means stores second image characteristic values respectively for the plural areas into which each of the original images forming a content item is divided, with the characteristic values associated with stereoscopic parameters for a corresponding one of the original images. On the other hand, the retrieval means compares the first image characteristic values calculated by the calculation means, with the second image characteristic values stored in the storage means, respectively for the areas of the original image, thereby to retrieve stereoscopic parameters associated with the particular original image. According to this exemplary embodiment, accuracy in retrieval of stereoscopic parameters can be improved. Further in this exemplary embodiment, for each of the plural areas into which one original image is divided, the calculation means calculates a numerical value depending on pixel values of pixels belonging to a corresponding one of the plural areas. Also this exemplary embodiment can adopt a configuration that relative values expressing the numerical values in relation to each other are calculated as first image characteristic values for the areas.

In an exemplary embodiment of the invention, the method in which the calculation means calculates first image characteristic values and the method in which second image characteristic values stored in the storage means are calculated are common to each other. In this case, a stereoscopic parameter can be retrieved by a simple processing of retrieving a second image characteristic value equal to a first image characteristic value. Naturally, both of the methods for calculating the first and second image characteristic values need not be identical to each other. If the two methods are not the same, a stereoscopic parameter for a particular original image can be retrieved by a configuration that the retrieval means retrieves a stereoscopic parameter associated with one of the second image characteristic values which is closest to a first image characteristic value calculated by the calculation means, or by a configuration that the retrieval means retrieves a stereoscopic parameter associated with one of the second image characteristic values which has a predetermined relationship with a first image characteristic value calculated by the calculation means.

In the present invention, a "particular original image" for which a first image characteristic value is calculated can be arbitrarily selected from plural original images forming a content item. For example, a first image characteristic value can be calculated from each of all original images forming a content item, with all of the original images respectively regarded as "particular original images". Alternatively, original images are calculated, which are selected at predetermined intervals from plural original images forming a content item can be respectively regarded as "particular original images", which are targets to be subjected to calculation of first image characteristic values. Now there is a case that stereoscopic parameters for plural original images are stored in the storage means, arranged in the same order as the arranged order of the plural original images (i.e., the storage means stores so that stereoscopic parameters can be read out sequentially in the same order as the arranged order of the original images). In this case, if a stereoscopic parameter for any original image is specified from a first image characteristic value of the original image, stereoscopic parameters for subsequent original images are sequentially specified as stereoscopic parameters subsequent to the specified stereoscopic parameter. Therefore, first image characteristic values less frequently need to be calculated for all original images. In a desirable exemplary embodiment of the invention, the storage means stores stereoscopic parameters for respective ones of plural original images in the order in which the plural original images are arranged. The retrieval means retrieves a stereoscopic parameter for a particular original image, and also retrieves sequentially stereoscopic parameters for original images successive to the particular original image, from the storage means. The stereoscopic imaging means generates stereoscopic images from the original images successive to the particular original image, based on the stereoscopic parameters sequentially retrieved by the retrieval means.

However, if a content item is reproduced in an expected order from a first original image, the stereoscopic parameters stored in the storage means need only to be associated with the arranged order of original images. In this case, image characteristic values less frequently need to be calculated for all original images. Meanwhile, if a playback point of a content item is changed in accordance with an instruction input by a user (e.g., an instruction about fast forwarding or rewinding of the content item), there is a possibility that it cannot be determined whether any of the stereoscopic parameters should be read from the storage means for an original image arranged at a position corresponding to the changed playback point or not. In another desirable exemplary embodiment of the invention, if a playback point of a content item is changed, the retrieval means retrieves a stereoscopic parameter regarding the original image arranged at a position corresponding to the changed playback point. According to this exemplary embodiment, a first image characteristic value is calculated for an original image arranged at a position corresponding to a playback point changed by a user (e.g., an original image reproduced immediately after fast forwarding or rewinding). Therefore, stereoscopic parameters for respective original images can be specified and utilized for generation of stereoscopic images, regardless of manipulations conducted by users. In other words, calculation of a first image characteristic value and retrieval of a stereoscopic parameter based on the value need to be executed only when an instruction to change a playback point is input by a user. Therefore, processing load can be more effectively reduced, compared with a configuration that processings as described are executed for all original images.

Depending on a content (e.g., pixel values of pixels) of each of the original images forming a content item, there is a case that first image characteristic values calculated from several original images are common to each other. This results in a case that one stereoscopic parameter cannot be uniquely specified for only one first image characteristic value of a particular original image, e.g., respectively different plural stereoscopic parameters are retrieved for one first image characteristic value which the calculation means has calculated from a particular original image. In this case, first image characteristic values for respective original images successive to the particular original image are taken into consideration, so that stereoscopic parameters for the particular and successive original images are obtained. That is, in a desirable exemplary embodiment of the invention, there is a case that plural stereoscopic parameters associated with respectively different original images are retrieved for a first image characteristic value calculated by the calculation means from the particular original image. In this case, stereoscopic parameters associated with the particular original image and original images successive to the particular original image are fixed by comparing first image characteristic values which the calculation means has calculated for original images successive to the particular original image, with second image characteristic values stored in the storage means.

If stereoscopic parameters are retrieved for first image characteristic values of plural original images, as described above, the stereoscopic imaging means cannot properly generate stereoscopic images before the retrieval means determines fixedly stereoscopic parameters. There can be a configuration of executing a stereoscopic processing, based on a stereoscopic parameter which has been already specified for any other original image before the stereoscopic parameters are determined fixedly. In this configuration, however, there is a possibility that stereoscopic images having a proper stereoscopic effect are not generated from the particular original image and original images successive to the particular original image. In a desirable exemplary embodiment of the invention, there occurs a case that respectively different plural stereoscopic parameters are retrieved for one first image characteristic value which the calculation means has calculated from a particular original image. Then, the stereoscopic imaging means stops generating stereoscopic images until stereoscopic parameters associated with the particular original image and the successive original images are determined fixedly by the retrieval means. According to this exemplary embodiment, stereoscopic parameters associated with the particular original image and the successive original images are utilized for generation of stereoscopic images only after the stereoscopic parameters are determined fixedly. Therefore, stereoscopic images having an optimal stereoscopic effect can be generated from the particular original image and the successive original images.

There is still another applicable configuration in which a stereoscopic parameter for each of the original images is retrieved by referring to another index in addition to a first image characteristic value of a particular original image. For example, a desirable exemplary embodiment of the invention is provided with a division means that divides plural original images obtained by the obtaining means into plural groups. Meanwhile, the storage means stores plural records divided into plural groups, the plural records respectively including second image characteristic values for original images and stereoscopic parameters for the original images. If plural stereoscopic parameters respectively associated with different original images are retrieved for a first image characteristic value calculated by the calculation means from a particular original image, the retrieval means compares the total number of original images in one of the plural groups divided by the obtaining means, to which the particular original image belongs, with the total number of original images associated with each of the groups of the records stored in the storage means. Stereoscopic parameters associated with one group to which the particular original image belongs are thereby retrieved, based on a comparison result. According to this exemplary embodiment, a stereoscopic parameter for each of the original images is retrieved based on the total number of original images belonging to each group in addition to a first image characteristic value. Therefore, retrieval accuracy can be improved compared with a configuration that a stereoscopic parameter is retrieved only based on a first image characteristic value. A specific example of this exemplary embodiment is described later in the third embodiment. Thus, an exemplary embodiment in which a stereoscopic parameter is retrieved depending on the total number of original images belonging to each group has been exemplified. In the invention, however, the index to be referred to in addition to image characteristic values for retrieving stereoscopic parameters is not limited to the index as described above.

A stereoscopic image generation device according to another aspect of the invention can be constituted as hardware such as a DSP (Digital Signal Processor) dedicated to image processings, and also as a program which works in cooperation with a computer such as a personal computer. The program causes a computer to execute: an obtaining processing of obtaining sequentially a plurality of original images arranged in a time line and forming a content item; a calculation processing of calculating a first image characteristic value from pixel values of a plurality of pixels included in one of the plurality of original images obtained by the obtaining processing; a retrieval processing of retrieving a stereoscopic parameter associated with the first image characteristic value calculated by the calculation processing, from a storage means that stores second image characteristic values for the plurality of original images and stereoscopic parameters for generating stereoscopic images from the plurality of original images, with the second image characteristic values respectively associated with stereoscopic parameters; and a stereoscopic processing of generating a stereoscopic image from a particular original image, based on the stereoscopic parameter retrieved by the retrieval processing. Also according to this program, the same functions and effects as described above can be obtained. The program according to the invention is supplied for users as a program recorded on portable recording media such as CD-ROMs and installed into computers. Alternatively, the program is distributed via a network from server devices and installed into computers.

BRIEF DESCRIPTION OF THE DRAWINGS

FIG. 4 is a view for explaining the content of an averaging processing;

FIG. 5 shows the content of a project file;

FIG. 6 shows the content of a file selection screen displayed when obtaining a project file from a server device;

FIG. 13 is a table showing another example of a project file in the first exemplary embodiment;

FIG. 14 is a view for explaining a method for calculating image characteristic values in the second exemplary embodiment according to the second embodiment of the invention;

FIG. 15 is a view for explaining another method for calculating image characteristic values in the second exemplary embodiment according to the second embodiment of the invention;

FIG. 22 is a table showing an example of a project file according to a modification of the invention; and FIG. 23 is a table showing another example of a project file according to a modification of the invention.

EXPLANATION OF REFERENCE SYMBOLS

D . . . Stereoscopic image generation device, 10 . . . Controller, 11 . . . Obtaining means, 12 . . . Calculation means, 13 . . . Retrieval means, 14 . . . Stereoscopic imaging means, 16 . . . Division means, 21 . . . Storage device, 24 . . . Communication section, 26 . . . A/D converter, 28 . . . Input device, 31 . . . Reproduction device, 32 . . . Reproduction device, 38 . . . Connector, 301 . . . DVD, 302 . . . Video tape, 33 . . . Input device, 41 . . . Display device, 45 . . . Recording medium, 51 . . . Communication network, 52 . . . Server device, Ga . . . Original image, Gb . . . Stereoscopic image, Pix . . . Pixel, PGM . . . Image processing program, Fp . . . Project file, R . . . Record, Nf . . . image characteristic value included in project files, P, Pi . . . Parameter group, Ng . . . image characteristic value calculated by the calculation means

DETAILED DESCRIPTION

A: First Embodiment

Figure 1:
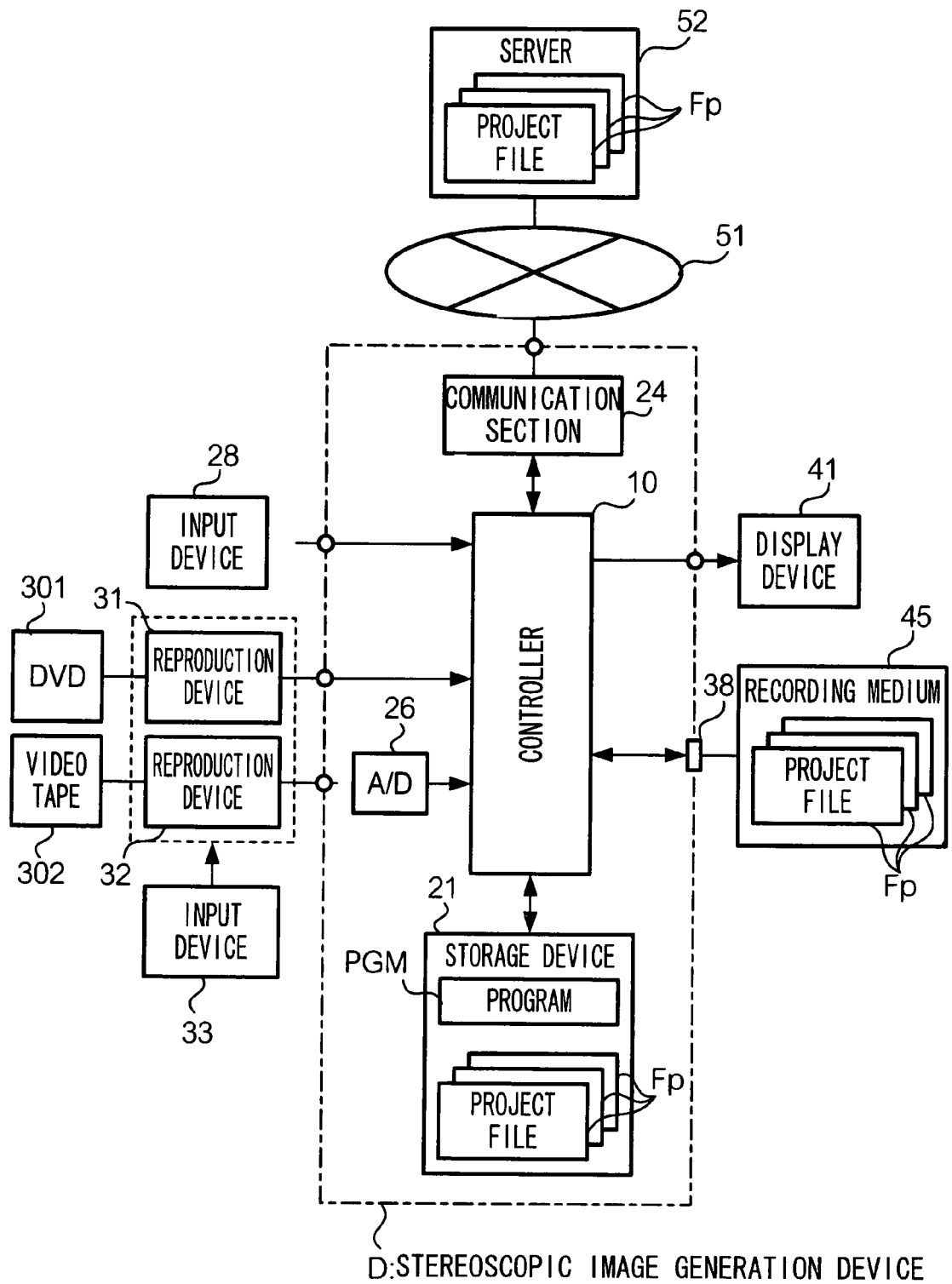
FIG. 1 is a block diagram showing a structure of a stereoscopic image generation device according to the first embodiment of the invention.

FIG. 1 is a block diagram showing a structure of a device for generating a stereoscopic image, according to the first embodiment of the invention. As shown in the figure, a stereoscopic image generation device D has a controller 10, a storage device 21 connected to the controller, a communication section 24, an A/D (Analog to Digital) converter 26, and a connecter 38. The controller 10 is connected to an input device 28, a reproduction device 31, and a display device 41. The A/D converter 26 has an input end connected to a reproduction device 32.

The reproduction device 31 sequentially reads out image data recorded on a DVD 301 to the controller 10. Meanwhile, the reproduction device 32 sequentially reads out and outputs image data recorded on a video tape 302. The image data output from the reproduction device 32 is converted into digital data by an A/D converter 26 and input to the controller 10. In each of the DVD 301 and the video tape 302, image data is stored as plural image data sets respectively expressing plural images (hereinafter "original images"), which are arranged in a time line, forming one or more content items such as cinemas. The image data sets express original images which are output from the reproduction devices 31 and 32. Each image data set is formed of data specifying pixel values for plural pixels forming a corresponding original image. In this embodiment, there is supposed that red, green, and blue gradation steps expressing pixels are used to specify pixel values.

A user can appropriately control the reproduction device 31 or 32 by manipulating an input device 33. As the user manipulates the input device 33 to give an instruction to reproduce a content item, the reproduction device 31 or 32 outputs image data sets in an arranged order in which corresponding original images are arranged, from the first one of the original images. If the user manipulates the input device 33 to give an instruction for fast-forwarding or rewinding during reproduction, the reproduction device 31 or 32 then outputs image data sets expressing original images from an original image arranged at a position corresponding to a playback point which is changed by the instruction. Thus, when an instruction to change a playback point is input, the reproduction device 31 or 32 then outputs, to the controller 10, a signal (hereinafter "playback point change signal") Sp commanding change of a playback point.

The controller 10 is a means for controlling respective components of the stereoscopic image generation device D. The controller 10 includes: a CPU (Central Processing Unit) for executing programs; a ROM (Read Only Memory) for storing the programs executed by the CPU; and a RAM (Random Access Memory) used as a work area for the CPU. The controller 10 performs various calculations and controls on respective components in accordance with the programs, to perform various functions. The input device 28 has plural manipulators to input characters and symbols, and outputs signals according to manipulations conducted by users. However, one single input device can be configured to manipulate both of the reproduction devices 31 or 32 and the stereoscopic image generation device D.

The storage device 21 is a means for storing programs executed by the controller 10 and various data used for executing the programs. For example, a hard disk device including a magnetic disk, or a disk device including a portable recording medium, typically a CDROM, can be used as the storage device 21. The storage device 21 stores not only an OS (Operating System) for controlling operations of the whole stereoscopic image generation device D but also an application program (hereinafter "image processing program") PGM for generating stereoscopic images from image data sets expressing original images, which are supplied to the stereoscopic image generation device D from the reproduction device 31 or 32. Each of the stereoscopic images is a synthetic image synthesized from two images, one of which is to be seen with the right eye of a user (hereinafter "right image") and the other with the left eye of the user (hereinafter "left image"). A parallax exists between the left and right images. Specifically, each of these images is obtained by horizontally shifting pixels forming an object included in an original image, by an amount (hereinafter "pixel displacement") depending on the depth of the object.

Stereoscopic images generated by the controller 10 are displayed by the display device 41. The display device 41 is a means for displaying various images under control of the controller 10, and includes, for example, a CRT (Cathode Ray Tube) or liquid crystal display panel. The display device 41 in this embodiment displays stereoscopic images, in a manner of allowing only the right eye of a user to see the right images forming the stereoscopic images as well as only the left eye to see the left images also forming the stereoscopic image. Various methods have been proposed for achieving such display. For example, in one such method, an observer wears a pair of glasses colored in complementary colors (the left and right lenses have different colors) or a pair of polarized glasses (in which left and right lenses are coated with polarization plates having different polarization axes). In another method, a view field of an observer is partially shielded by a mechanism such as lenticular lenses or a parallax barrier. In this manner, the user as an observer sees the right image with the right eye and the left image with the left eye, so that the user can feel depths of objects included in an original image, depending on pixel displacements of the objects.

Figure 2:
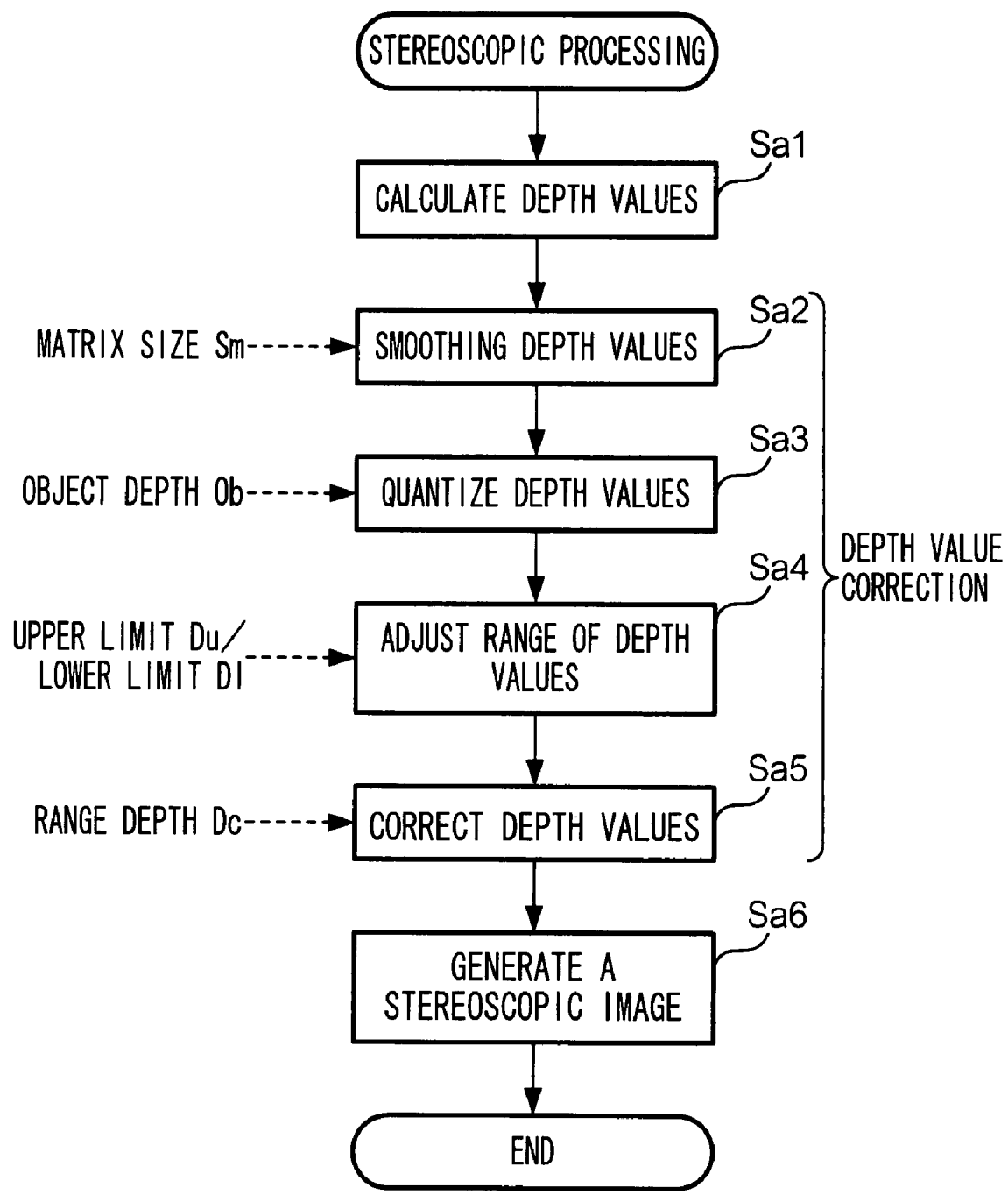
FIG. 2 is a flowchart specifically showing a content of a stereoscopic processing.

Characteristics of a stereoscopic image generated from an original image by the controller 10 are determined according to stereoscopic parameters which are set for the original image. Prior to describing individual components constituting the stereoscopic image generation device D, a content of a processing (hereinafter "stereoscopic processing") for generating stereoscopic images from original images will now be described, specifically referring to meanings of individual stereoscopic parameters. FIG. 2 is a flowchart showing an example of specific content of the stereoscopic processing. The stereoscopic processing is started by executing the image processing program PGM. Then, the controller 10 calculates a depth value (Z-value) for each pixel, based on an image data set expressing an original image (step Sa1). The depth values are numerical values which base determination of pixel displacements. In this embodiment, the depth values are calculated as follows. Numerical values (pixel values) indicating red, green, and blue gradation steps of each pixel are respectively multiplied by predetermined coefficients. The multiplication results are then added up together to obtain one depth value. The description below supposes a case of expressing each depth value as an eight-bit value so that each depth value is within a total 256 numerical values from "0" to "256".

Figure 3A:
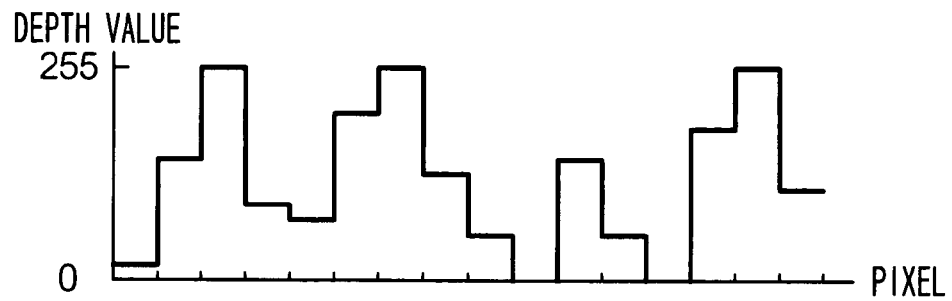
FIG. 3 are graphs for explaining a content of processing for correcting depth values based on stereoscopic parameters.

Subsequently, the controller 10 executes a processing for correcting the depth value calculated in the step Sa1, in order that a stereoscopic effect influenced on a stereoscopic image is rendered more natural (steps Sa2 to Sa5). FIG. 3 show, step by step, states of changes of depth values in accordance with this correction processing. In the figure, positions of pixels existing in one row (e.g., pixels arranged in a lateral direction on the display screen of the display device 41) are expressed along the horizontal axis. Depth values of the pixels are expressed along the vertical axis. The depth values calculated in the step Sa1 are shown in FIG. 3A.

Figure 3B:
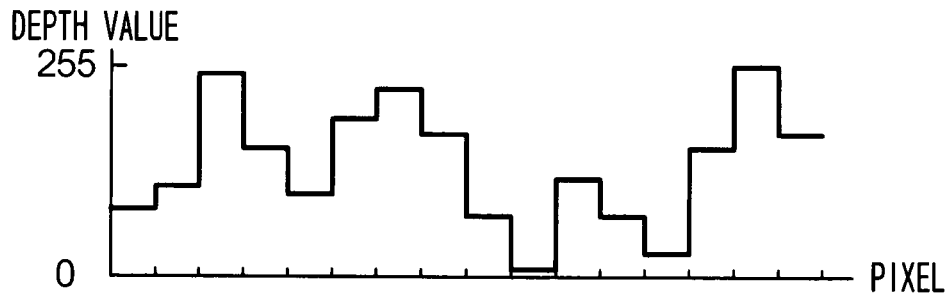
Figure 3C:
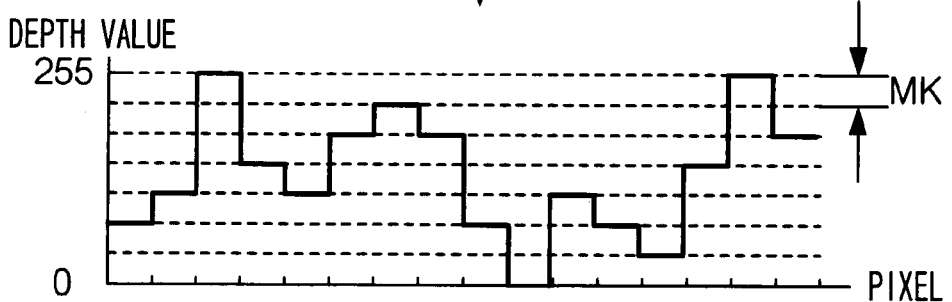
Figure 3D:
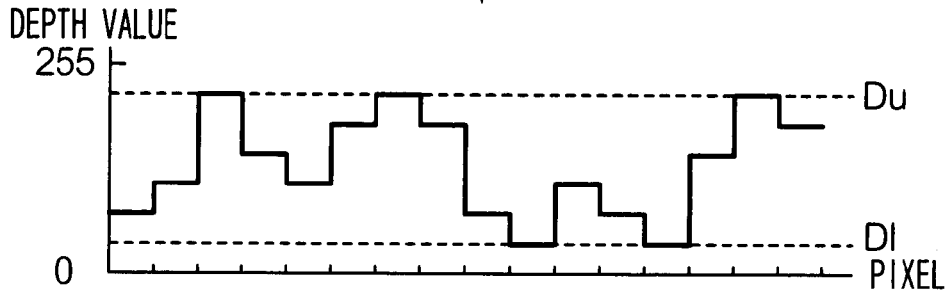

If there is an extremely large difference between depth values of mutually adjacent pixels in an original image, quality of a stereoscopic image perceived by the user may deteriorate. Therefore, the controller 10 performs a processing for averaging the depth values calculated in the step Sa1 (step Sa2). More specifically, as shown in FIG. 4, the controller 10 changes the depth value of each pixel Pix included in an original image Ga, to an average value of depth values of pixels belonging to a unit area (hereinafter "matrix area") Am which is defined so as to include the pixel Pix at the upper left corner of the matrix area. As a result of this processing, as shown in FIG. 3B, the difference between the changed depth values of every mutually adjacent pixel Pix in the original image Ga is smaller than that between the depth values calculated in the step Sa1. The size Sm of the matrix area Am (hereinafter "matrix size") is indicated as one of stereoscopic parameters. The larger the matrix size Sm, the more the pixels referred to for calculating each average value. Accordingly, the difference between mutually adjacent pixels Pix relatively decreases (e.g., the difference expresses an amount by which each pixel Pix is shifted), and as a result, the stereoscopic effect perceived by the user decreases. Inversely, the smaller the matrix size Sm, the fewer the pixels referred to for calculation of each average value. Accordingly, the difference between mutually adjacent pixels Pix decreases relatively, and as a result, the stereoscopic effect perceived by the user decreases. That is, the matrix size Sm is a stereoscopic parameter that determines magnification of the stereoscopic effect which is felt by a user who sees the stereoscopic image.

Meanwhile, one pixel Pix is a minimum unit to express each pixel displacement in a stereoscopic image. It is hence supposed that, each time a depth value increases by "1"; a related pixel displacement is increased by one pixel Pix as the minimum unit. On this supposition, when a depth value takes "255" as a maximum value, a related pixel displacement becomes equivalent to 256 pixels Pix. However, if the pixel displacement is too large (for example, 8 mm or more on the display screen of the display device 41), the user looking at the stereoscopic image suffers from eye strain in some cases, or cannot feel a stereoscopic effect as a result of recognizing the right and left images as images independent from each other. To address this problem, this embodiment is configured to execute a processing (hereinafter "quantization processing") for approximating depth values of pixels Pix calculated in the step Sa2, to discreet values which respectively represent several levels (step Sa3). More specifically, the controller 10 divides the depth value of each pixel Pix calculated in the step Sa2 by a particular value (hereinafter "rounding coefficient") MK. The division result is rounded to an integer which is further multiplied by the same rounding coefficient MK. As a result, the depth value of each pixel Pix is approximated to a numerical value equivalent to an integral multiple of the rounding coefficient MK. Accordingly, the rounding coefficient MK is considered to be a stereoscopic parameter indicating an interval between the discreet values to which depth values are to be approximated. Available as the rounding coefficient MK in this embodiment is an integral part of a numerical value obtained by dividing the maximum value ("255" in this example) among the depth values calculated in the step Sa1 by an object depth Ob. The object depth Ob is a stereoscopic parameter indicating the number of levels of depth values calculated in the step Sa3. As described above, the number of levels into which the pixel displacements are classified is proportional to the number of levels into which depth values are classified. Therefore, the object depth Ob can be said to be a stereoscopic parameter indicating a size of an interval between the deepest position and a frontend position which the user feels when seeing a stereoscopic image.

Subsequently to the quantization processing, the controller 10 performs a processing for limiting the depth value of each pixel Pix to a value within a particular range (step Sa4). That is, if a depth value of any pixel Pix, which has been calculated in the step Sa3, is greater than an upper limit Du, the controller 10 changes the depth value of a related pixel Pix to the upper limit Du. On the other hand, if a depth value of any pixel Pix is smaller than a lower limit Dl, the controller 10 changes the depth value of a related pixel Pix to the lower limit Dl. The upper limit Du and lower limit Dl are also stereoscopic parameters. Further, the controller 10 adds a common numerical value (hereinafter "range depth") Dc to each of the pixels Pix subjected to the step Sa4 (step Sa5). The field depth Dc is a stereoscopic parameter indicating a depth to be reflected commonly on the whole original image Ga. That is, the object depth Ob (or rounding coefficient MK) specifies a range defined between the deepest position and frontend position which the user can feel. In contrast, the range depth Dc specifies a total depth of the entire range.

In this manner, the processings for correcting depth values are completed. The controller 10 then generates a stereoscopic image based on the depth values of respective pixels Pix (step Sa2). That is, each pixel Pix included in an original image Ga is displaced in horizontal directions by an amount corresponding to the depth value of the pixel Pix, thereby forming right and left images. By synthesizing both images, a stereoscopic image is generated. Content of the stereoscopic processing has thus been specifically described above. According to the invention, a content of the processings for generating a stereoscopic image or configurations of stereoscopic parameters utilized in each of the processings are naturally not limited to those exemplified above.

The storage device 21 shown in FIG. 1 stores plural project files Fp which are related to different content items. Each of the project files Fp specifies groups of plural stereoscopic parameters (hereinafter "parameter groups") such as a matrix size Sm, an object depth Ob, etc., with the groups respectively specified for original images Ga forming one content item. That is, the controller 10 executes a stereoscopic processing to generate stereoscopic images, in a manner that original images Ga forming a content item being reproduced by the reproduction device 31 or 32 are respectively applied with parameter groups specified for the original images Ga by a project file Fp corresponding to the content item being reproduced. Stereoscopic parameters for generating stereoscopic images, which make a user feel an optimal stereoscopic effect, vary sequentially depending on the content of each of the original images Ga. Therefore, stereoscopic parameters in parameter groups in a project file Fp are set to optimal values for each of the original images Ga.

In case of only supposing that a content item is reproduced just in an expected order from the beginning of the content item, optimal stereoscopic images can be generated by selecting parameter groups for respective original images Ga in the order in which the original images Ga are arranged sequentially. However, for example, if a playback point of the content item is changed by a manipulation of a user (such as a fast-forwarding or rewinding manipulation), parameter groups for original images Ga to be reproduced after changing the playback point cannot be specified from only the content of the parameter groups. That is, proper coupling (matching) cannot be achieved any more between the respective original images Ga forming the content item and the parameter groups to be applied to the respective original images Ga during the stereoscopic processing. To address this problem, the project file Fp according to this embodiment has a data structure in which parameter groups to be applied to original images Ga during the stereoscopic processing are respectively associated with numerical values (hereinafter "image characteristic values") calculated from pixel values of pixels forming the original images.

More specifically, as shown in FIG. 5, a project file Fp has a data structure in which plural records R respectively associated with original images Ga of a content item are arranged in an order in which the original images Ga should be reproduced. Each of the records R includes: an identifier assigned to one of the associated original images Ga forming the content item; an image characteristic value Nf calculated for the associated original image Ga; and a parameter group P to be applied to the associated original image Ga during the stereoscopic processing of the associated original image Ga.

According to this embodiment, the image characteristic value Nf is a numerical value indicating a sum of pixel values of the whole pixels Pix forming one original image Ga. In FIG. 5, an original image assigned with an identifier "0001" is given an image characteristic value Nf of "1342". In the parameter group P applied to this original image Ga during the stereoscopic processing, "23" and "124" are respectively supposed to be specified as a matrix size Sm and an object depth Ob. In this structure, a record R associated with each original image Ga output from the reproduction device 31 or 32 is retrieved by comparing image characteristic values (Ng) of the original image Ga with image characteristic values Nf included in a project file Fp. The parameter group P included in the retrieved record R is specified as a parameter group to be utilized for the stereoscopic processing of an associated original image Ga (details of this processing will be described later). Project files Fp as described above are created separately from the content items recorded on the DVD 301 and the video tape 302, and are then stored into the storage device 21 via the communication section 24 and connector 28. In this respect, further detailed description will be made below.

The connector 38 shown in FIG. 1 is, for example, a connection port according to USB (Universal Serial Bus) standards. The connector 38 is connected to a portable recording medium (so-called memory card) 45 including a semiconductor memory such as an EEPROM (Electrically Erasable Programmable Read Only Memory). The recording medium 45 records one or plural project files Fp. When the recording medium 45 is connected to the connector 38 by a user, the controller 10 reads plural project files Fp recorded on the recording medium 45, and writes the project files into the storage device 21. As an alternative configuration, the project files Fp recorded on the recording medium 45 can directly be read out and used when the controller 10 performs a stereoscopic processing.

The communication section 24 is a means for communicating with other communication terminals via a communication network 51 such as the internet. The communication network 51 is connected to a server device 52. The server device 52 is, for example, a WWW (World Wide Web) server, and stores plural project files Fp respectively associated with different content items. The communication section 24 receives project files Fp from the server device 52, by making communication via the communication network 51 under control of the controller 10. A procedure for obtaining a project file Fp from the server device 52 will now be described below.

The communication section 24 accesses the server device 52 via the communication network 51. Then, a screen (hereinafter "file selection screen") 411 as exemplarily shown in FIG. 6 is displayed on the display device 41. The file selection screen 411 is to allow a user of the stereographic image generation device D to select any of the plural content items. The file selection screen 411 includes a list which cites titles of the plural content items respectively coupled with command buttons B. The user selects a command button B for a content item by manipulating the input device 28. Then, the server device 52 selects a project file Fp for the content item selected by the user, among plural project files Fp which have been accumulated in advance. The server device 52 transmits the selected project file Fp to the communication network 51. The communication section 24 receives the project file Fp from the communication network 51. Further, the project file Fp received by the communication section 24 is stored into the storage device 21 by the controller 10. Thus, the content of each project file and a method for obtaining a project file have been described above.

Figure 7:
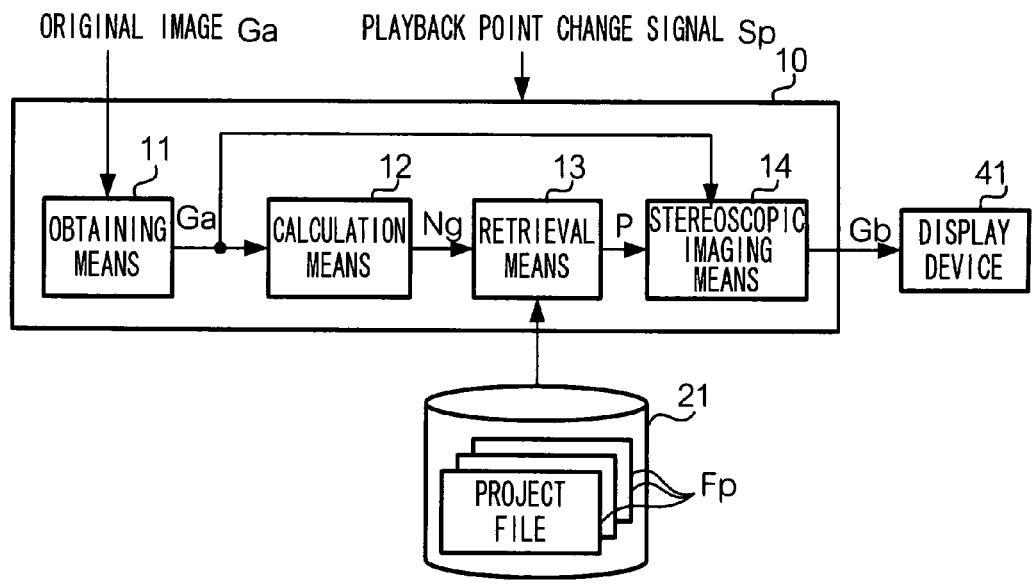
FIG. 7 is a block diagram showing a functional configuration of a controller.

Next, FIG. 7 is a block diagram showing a functional structure of the controller 10. Functions of respective means shown in the figure are performed by executing the image processing program PGM. An obtaining means 11 shown in FIG. 7 is a means for obtaining image data sets expressing plural original images Ga which are output from the reproduction device 31 or 32. As has been described previously, the reproduction devices 31 and 32 each read and output sequentially image data sets in an order in which the original image Ga are arranged, and the original image data sets respectively express the original images Ga recorded on the DVD 301 or the video tape 302. Therefore, the obtaining means 11 obtains image data sets of the respective original images Ga in the arranged order of the original images Ga. The image data sets of the original images Ga, which are obtained by the obtaining means 11, are supplied to both of a calculation means 12 and a stereoscopic imaging means 14.

The calculation means 12 is a means for calculating an image characteristic value Ng from the image data set of each of the original images Ga obtained by the obtaining means 11. A method which the calculation means 12 adopts to calculate image characteristic values Ng is the same as the method for calculating image characteristic values Nf for a project file Fp, as has been described previously. That is, the calculation means 12 calculates an image characteristic value Ng for an original image Ga by summing up pixel values of all pixels Pix expressing the image data set of the original image Ga.

Meanwhile, a retrieval means 13 is a means for retrieving any of a plural parameter groups included in a project file Fp, based on an image characteristic value Ng calculated by the calculation means 12. More specifically, the retrieval means 13 retrieves, from a project file Fp, an image characteristic value Nf equal to an image characteristic value Ng calculated for an original image Ga by the calculation means 12. From the storage device 21, the retrieval means 13 further reads out a parameter group P associated with the retrieved image characteristic value Nf, as a parameter group to be applied to the original image Ga being subjected to the stereoscopic processing. This embodiment is configured so that records R respectively including parameter groups P for plural original images Ga are arranged in the order in which the plural original images Ga are arranged sequentially. Accordingly, if only one parameter group P for one particular original image Ga is specified based on one image characteristic value Ng associated with the particular original image Ga, parameter groups P successive to the specified parameter group P can be naturally specified because the successive parameter groups P are also arranged behind the specified parameter group P for the particular original image Ga in the project file Fp. Therefore, parameter groups P for all of the original images Ga forming one content item need not be retrieved based on all associated image characteristic values Ng. This embodiment is therefore configured so as to retrieve parameter groups P for only several particular original images Ga (which will be hereinafter referred to also as "particular images Gs" in some cases). More specifically, the particular original images are the first ones of original images Ga forming a content item, and one other original image Ga which is obtained by the obtaining means 11 immediately after a playback point change signal Sp is input from the reproduction device 31 or 32.

The stereoscopic imaging means 14 is a means for generating a stereoscopic image Gb in accordance with the procedure shown in FIG. 2. The stereoscopic imaging means 14 generates image data sets expressing a stereoscopic image Gb for each original image Ga, by performing a stereoscopic processing on each original image Ga obtained by the obtaining means 11, while applying stereoscopic parameters of an associated parameter group P retrieved by the retrieval means 13 to each original image Ga. Generated image data sets are output to the display device 41, thereby to show stereoscopic images Gb.

Figure 8:
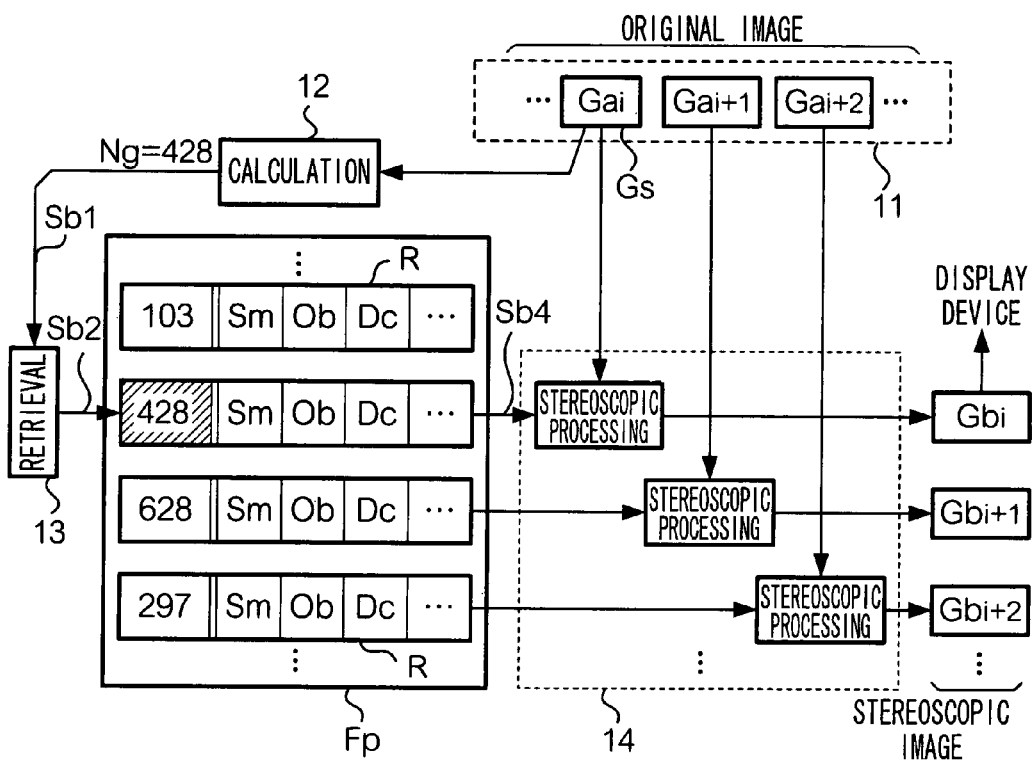
FIG. 8 shows a flow of processings performed by the controller.

Next, operation of this embodiment will be described. FIG. 8 is a block diagram showing a flow of processings which the controller 10 executes in the form of respective means shown in FIG. 7. As shown in FIG. 8, an image data set of each of the original images Ga forming a content item is obtained by the obtaining means 11. Then, the calculation means 12 calculates an image characteristic value Ng from the obtained image data set, for each original image Ga.

Next, the retrieval means 13 retrieves a parameter group P associated with each original image Ga from a project file Fp. At first, reproduction of a content item is started, and an image characteristic value Ng for a first original image Ga (which is a particular image Gs) is calculated by the calculation means 12. Then, the retrieval means 13 retrieves a project file Fp associated with the content item as a target to be reproduced, among plural project files Fp stored in the storage device 21. More specifically, the retrieval means 13 specifies one project file Fp (which is associated with the content item being now a target to be reproduced) which includes, in a first record R in the project file Fp, an image characteristic value Ng equal to the image characteristic value Ng calculated by the storage device 21. Further, the retrieval means 13 reads out a parameter group P included in the first record R from the retrieved project file Fp, and outputs the parameter group P to the stereoscopic imaging means 14, as a parameter group for the particular image Gs. The retrieval means 13 then reads and outputs parameter groups P respectively included in records R in the retrieved project file Fp to the stereoscopic imaging means 14, sequentially in an order in which the records R are arranged. By processings as described above, the stereoscopic imaging means 14 performs the stereoscopic processing on plural original images Ga arranged in a predetermined order from the beginning of a content item, while applying stereoscopic parameters of parameter groups P respectively set for the original images Ga. Stereoscopic images Gb generated in this manner are sequentially displayed by the display device 41.

Figures 9, 10:
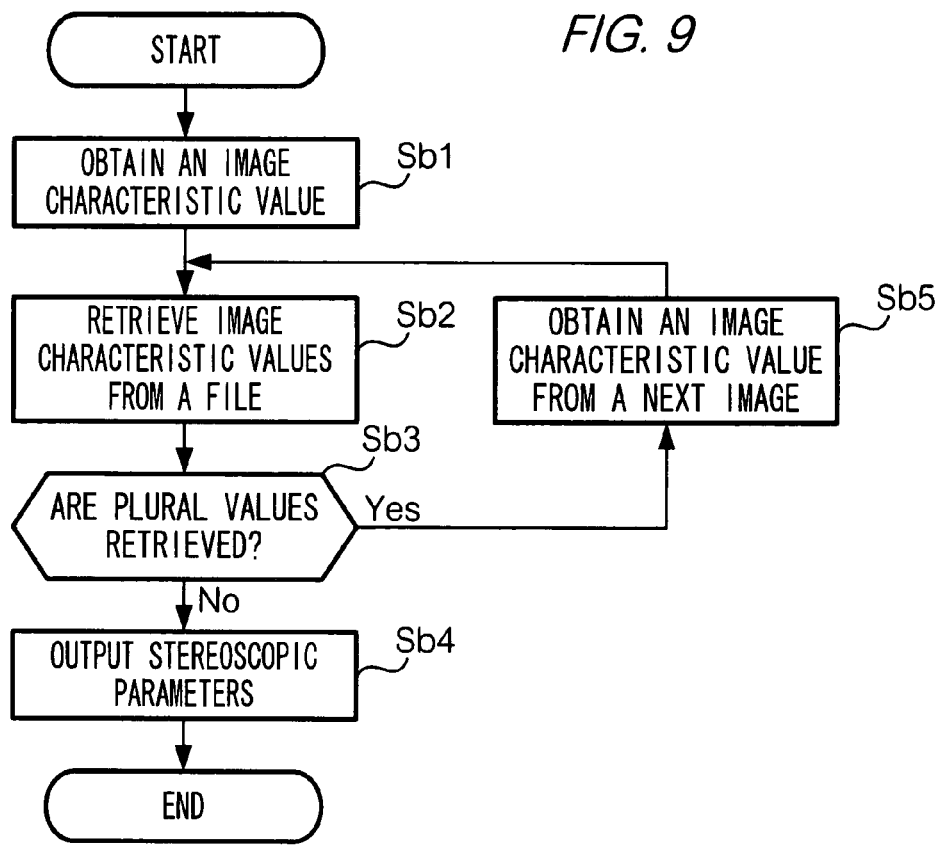
FIG. 9 is a flowchart showing the content of a processing performed by a retrieval means.
FIG. 10 is a table showing an example of a project file including plural records having equal image characteristic values.

Meanwhile, if a playback point change signal Sp is input, triggered by a manipulation on the input device 33 after starting reproduction of a content item, the retrieval means 13 executes a processing shown in FIG. 9 to newly retrieve parameter groups P for respective original images Ga. That is, when an image characteristic value Ng (or a particular image Gs) is obtained from the calculation means 12 (step Sb1) immediately after a playback point Sp is input, the retrieval means 13 then retrieves any record R including an image characteristic value Nf equal to the image characteristic value Ng obtained in the step Sb1, from the project file Fp. At this time, if only one record R is retrieved (step Sb3: No), the retrieval means 13 simply reads a parameter group P included in the record R and outputs the parameter group P to the storage device 21 (step Sb4). FIG. 8 supposes a case that a numerical value "428" is calculated as an image characteristic value Ng for an image Gai as a particular image Gs immediately after a playback point change signal Sp is input. In this case, a record R including "428" as an image characteristic value Nf is retrieved from the project file Fp, and a parameter group P included in the record R is read out. As shown in FIG. 8, the parameter group P read out is used to generate a stereoscopic image from the original image Gai as a particular image Gs. Next, the retrieval means 13 sequentially reads out parameter groups P respectively from records R successive to the record R retrieved in the step Sb2. For example, in the case of FIG. 8, a parameter group P is read out from a record R including "628" as an image characteristic value Nf, and is used for the stereoscopic processing performed on an original image Gai+1. Subsequently, a parameter group P for a further record R including "297" as an image characteristic value Nf, and is used for the stereoscopic processing performed on an original image Gai+2.

Depending on the content of original images Ga forming a content item, there is a case that plural records R in a project file Fp include one equal image characteristic value Nf. In this case, one parameter group P cannot be uniquely specified for one particular image Gs, from only the image characteristic value Ng of the particular image Gs. Therefore, the retrieval means 13 in this embodiment determines whether or not plural records R are retrieved from an image characteristic value Ng obtained in the step Sb1 (step Sb3). If plural records R are determined to have been retrieved (step Sb3), a parameter group P is then specified based on an image characteristic value Ng of an original image Ga successive to the particular image Gs. That is, if plural records R are determined to have been retrieved in the step Sb3, the retrieval means 13 obtains an image characteristic value Ng of an original image Ga successive to the particular image Gs from the calculation means 12 (step Sb5). The retrieval means 13 further retrieves a sequence of two successive records R. The two successive records R respectively include an image characteristic value Ng of the particular image Gs, which is obtained in the step Sb1, and another image characteristic value Ng of an original image Ga successive to the particular image Gs, which is newly obtained in the step Sb4. For example, FIG. 10 exemplarily shows a project file Fp in which both image characteristic values Nf of original images Ga assigned with image identifiers "0053" and "0078" have a common numerical value "845". In this case, the step Sb3 determines that plural records R have been retrieved. However, the original image Ga assigned with the image identifier "0053" is determined as a particular image Gs by obtaining "643" as an image characteristic value Ng of a next original image Ga (step Sb5). After one record R is specified for the particular image Gs in this manner, the retrieval means 13 outputs parameter groups P for the particular original image Ga assigned with the image identifier "0053" and the successive original image Ga assigned with the image identifier "0054", to the stereoscopic imaging means 14. The above example has been described referring to a case of specifying parameter groups P, based on image characteristic values of a particular image Gs and an original image Ga directly successive to the particular image Gs. However, there still is a case that a record R cannot be uniquely specified even by referring to image characteristic values Ng of a particular image Gs and an original image Ga successive to the particular image Gs. In this case, the retrieval means 13 retrieves a record R by still referring to an image characteristic value of a further successive original image Ga. Thus, the content of processing performed by the retrieval means 13 have been described above.

As shown in FIG. 8, the stereoscopic imaging means 14 generates image data sets of stereoscopic images Gb respectively from image data sets of original images Ga which are supplied by the obtaining means 11. The generated image data sets are output to the display device 41 so that the stereoscopic images Gb are displayed. However, there is a case that image characteristic values Ng of plural original images Ga need to be referred to because of parameter groups P which cannot be uniquely specified by only one image characteristic value Ng of a particular image Gs. In this case, supply timing of a parameter group P can be later than supply timing of an associated image data set. For example, there is a case that an image data set of an original image Ga has been supplied from the obtaining means 11 while a parameter group P associated with the original image Ga has not yet been supplied by the retrieval means 13. In this case, the stereoscopic imaging means 14 outputs, directly to the display device 41, the image data set which has been received from the obtaining means 11 before an associated parameter group P is supplied from the retrieval means 13, without performing the stereoscopic processing on the received image data set. The stereoscopic imaging means 14 restarts the stereoscopic processing from a later image data set which is obtained by the obtaining means 11 after a parameter group P associated with the later image data set is obtained. Accordingly, in this case, original images Ga supplied to the stereoscopic imaging means 14 during a period from when the retrieval means 13 starts retrieving a parameter group to when a parameter group is actually found are displayed as plane images by the display device 41 (without being subjected to the stereoscopic processing). However, this period is substantially too short for users to be aware of.

As has been described above, in this embodiment, parameter groups P are specified respectively based on image characteristic values Ng of original images Ga forming a content item. Therefore, even when reproducing a content item not given stereoscopic parameters, proper stereoscopic parameters can be applied to each of the original images Ga to generate stereoscopic images with a natural stereoscopic effect. Further, even when a parameter group P cannot uniquely be specified by only referring to an image characteristic value Ng of a particular image Gs, a parameter group P associated with the particular image Gs can be specified by further referring to an image characteristic value Ng of a next original image Ga to the particular image Gs.

B: Second Embodiment

Content of the project file Fp exemplified in the first embodiment can be changed appropriately. Exemplary embodiments concerning such changes to the content of the project file Fp will now be described below. The same structure of the stereoscopic image generation device D as in the first embodiment is applied to the stereoscopic image generation device D in the exemplary embodiments described below. Therefore, components constituting the stereoscopic image generation device D in the second embodiment, which are common to the stereoscopic image generation device D in the first embodiment, will be denoted with common reference symbols. Detailed description of such common components will be omitted herefrom where appropriate. Where image characteristic values Ng and Nf need not be distinguished from each other in the description made below, both image characteristic values are referred to simply as "image characteristic values N".

B-1: First Exemplary Embodiment

Figures 11, 12:
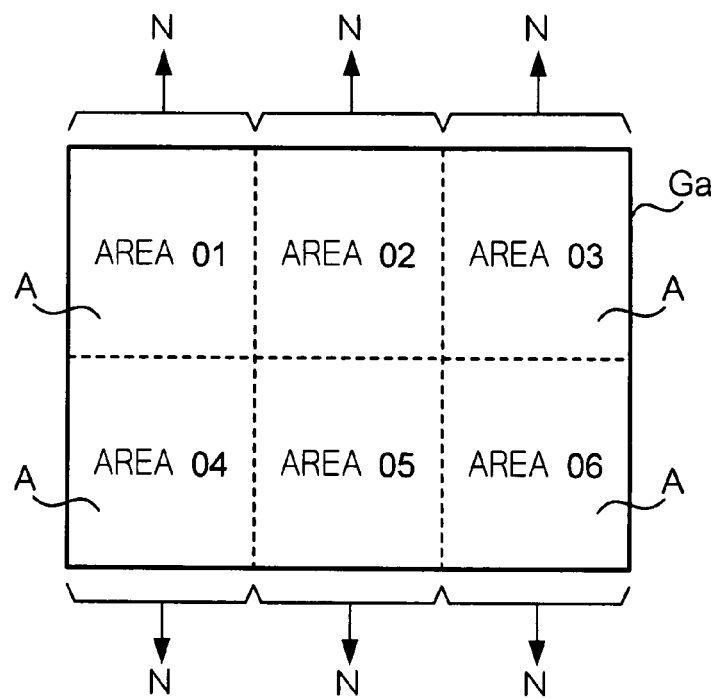
FIG. 11 is a view for explaining a method for calculating image characteristic values in the first exemplary embodiment according to the second embodiment of the invention.
FIG. 12 is a table showing the content of a project file.

The above first embodiment exemplifies a case of calculating an image characteristic value N from pixel values of whole pixels Pix forming an original image Ga. In contrast, in this exemplary embodiment, each original image Ga is divided into plural areas A, and an image characteristic value N is calculated for each of the areas A. FIG. 11 exemplifies a case of dividing horizontally and vertically an original image Ga into six areas A of 3 columns×2 rows. The number of areas thus divided can be arbitrarily changed. Meanwhile, as shown in FIG. 12, a record R associated with an original image among records R in a project file Fp includes: an identifier assigned to the original image; numbers assigned respectively to the areas A; image characteristic values Nf respectively for the areas A, which are numerical values each indicating a sum of pixel values of all pixels Pix belonging to a corresponding area A; and a parameter group P including plural stereoscopic parameters.

In this exemplary embodiment, the calculation means 12 calculates an image characteristic value Ng for each of the areas A of an original image Ga, from the image data set of an original image Ga, which is obtained by the obtaining means 11. The calculation means 12 further outputs the calculated image characteristic value Ng to the retrieval means 13 (see FIG. 11). At this time, how each original image Ga should be divided (e.g., the number of areas A or the number of columns or rows of areas A) is common to that supposed when a project file Fp was prepared. Meanwhile, the retrieval means 13 retrieves a record R associated with a particular image Gs by comparing image characteristic values Ng of respective areas A, which are calculated for the particular image Gs by the calculation means 12, with image characteristic values Nf of respective areas A in each of records R included in a project file Fp (step Sb2 in FIG. 9). The retrieval means 13 notifies the stereoscopic imaging means 14 of a parameter group P included in the retrieved record R (step Sb4). If one record R cannot uniquely be specified by image characteristic values Ng of a particular image Gs, a record R for the particular image Gs is then specified by further referring to image characteristic values Ng of a next original image Ga successive to the particular image Gs, as in the first embodiment described previously.

Thus, according to this exemplary embodiment, plural image characteristic values Ng are calculated for one original image Ga. Based on the plural image characteristic values Ng, a parameter group P is retrieved. Therefore, this exemplary embodiment is capable of retrieving parameter groups more accurately than the first embodiment. Further, parameter groups P can be more frequently specified uniquely only from image characteristic values Ng of particular images Gs than in the first embodiment. Accordingly, there is achieved a reduction in processing load which is applied by additionally referring to image characteristic values Ng of a next original image successive to a particular image Gs when specifying a parameter group P.

B-2: Second Exemplary Embodiment

The first embodiment and the first exemplary embodiment exemplify a configuration that an image characteristic value N is calculated from pixel values of all pixels Pix forming an original image Ga. In contrast, in the second exemplary embodiment, an image characteristic value N is calculated from pixel values of pixels Pix forming a part of an original image Ga. For example, as indicated by hatching in FIG. 14, a numerical value obtained by summing up pixel values of plural pixels Pix belonging to a particular area (e.g., one row in this figure) Ap in each of original images Ga forming a content item is included as an image characteristic value Nf for each of the original images Ga, in a project file Fp. On the other hand, the calculation means 12 outputs, as an image characteristic value Nf, a sum of pixel values of pixels Pix belonging to the same particular area Ap in each of original images Ga obtained by the obtaining means 11. According to this exemplary embodiment, the same effects as those obtained in the first embodiment can be obtained. Further according to this exemplary embodiment, the number of pixels Pix as targets subjected to calculation of an image characteristic value Ng is smaller than that in the first embodiment. Therefore, there can be achieved a reduction in processing load which is applied by the processing for calculating the image characteristic value Ng. How the area Ap including pixels as targets subjected to calculation of an image characteristic value N should be configured is not limited to the example shown in FIG. 14. For example, this exemplary embodiment can be configured so as to calculate an image characteristic value N from pixel values of pixels Pix belonging to one column of an original image Ga. In addition, pixels Pix as targets to be subjected to calculation of an image characteristic value N need not always be successive in series. For example, as shown in FIG. 15, this exemplary embodiment can be configured to select pixels Pix (as indicated by hatching in FIG. 15) in accordance with a predetermined rule, from plural pixels Pix forming an original image Ga. An image characteristic value N can then be calculated from pixel values of the selected pixels. Otherwise, in the configuration of dividing an original image Ga into plural areas A as in the first exemplary embodiment, image characteristic values N each can be calculated from pixel values of pixels belonging to a part of an area A.

B-3: Third Exemplary Embodiment

There is a case that pixel values of pixels Pix forming an original image Ga vary depending on the specs of reproduction devices (31 or 32) even when the same content item is reproduced. For example, pixel values of pixels Pix output from a reproduction device having a function of executing a correction processing (such as gamma calibration) on image data sets can be different from those output from another reproduction device which does not perform such a correction processing. In a configuration as in the first exemplary embodiment in which a sum of pixel values of pixels forming an original image Ga is taken as an image characteristic value N, a parameter group P can be properly retrieved if a reproduction device supposed to be used for calculation of the image characteristic value N is connected to the stereoscopic image generation device D. However, if a different reproduction device is connected to the stereoscopic image generation device D, there is a possibility that an image characteristic value Nf included in a project file Fp is not equal to any image characteristic value Ng calculated by the calculation means 12. Consequently, parameter groups P cannot properly be retrieved respectively for original images Ga. This exemplary embodiment is therefore configured so that a sum of pixel values of each area A is not included but a relative value of the sum of Pixel values of each area A is included as an image characteristic value Nf in a project file Fp.

Figures 16, 17:
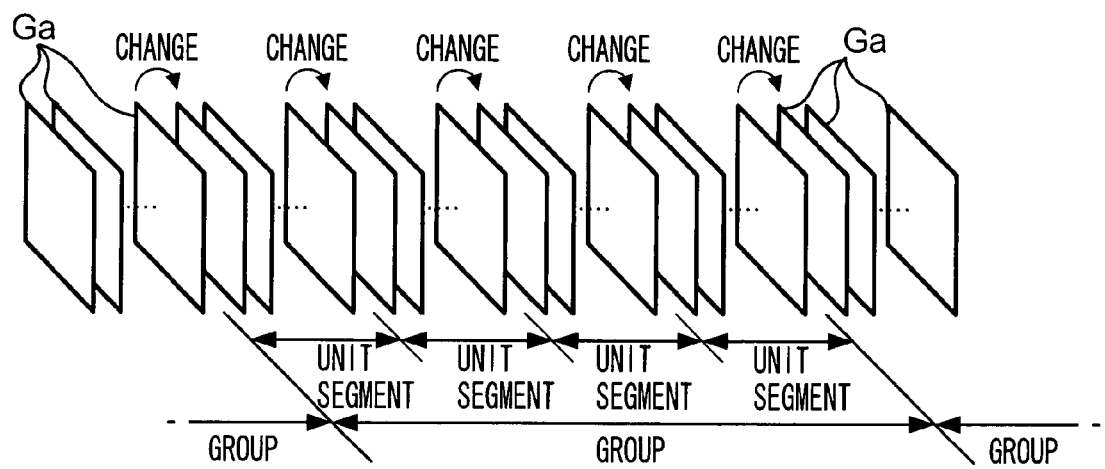
FIG. 16 is a table showing the content of a project file in the third exemplary embodiment according to the second embodiment of the invention.
FIG. 17 shows how plural original images forming one content are divided into groups.

In the project file Fp shown in FIG. 16, relative values are utilized in place of image characteristic values Nf included in the project file Fp shown in FIG. 13. Specifically, in the project file Fp shown in FIG. 13, "1342" is an image characteristic value Nf of the area A assigned with an area number "01", i.e., "1342" is a sum of pixel values of pixels included in this area A, in an original image Ga assigned with an image identifier "0001". "345" is an image characteristic value Nf of the area assigned with an area number "02", i.e., "345" is a sum of pixel values of pixels included in this area as well. In contrast, in the project file Fp shown in FIG. 16, a sum of pixel values of pixels included in the area A assigned with the area number "01" is taken as a reference value "1", in an original image Ga assigned with an image identifier "0001". At this time, relative values which are expressed in relation to the reference value "1" are respectively taken as image characteristic values Nf for the other areas A. For example, an image characteristic value Nf for an area A assigned with an area number "02" is "0.257 (=345/1342)". Meanwhile, the calculation means 12 in this exemplary embodiment calculates a sum of pixel values for each area A, from an original image Ga obtained by the obtaining means 11. The calculation means 12 further outputs a relative value of the calculated sum, as an image characteristic value Ng for an associated area A, to the retrieval means 13. Operation of the retrieval means 13 is the same as that in the first exemplary embodiment. According to this exemplary embodiment, image characteristic values N (including both Ng and Nf) in each original image Ga are expressed as values relative to each other. Therefore, parameter groups P can be retrieved accurately regardless of specs of the reproduction device connected to the stereoscopic image generation device D.

C: Third Embodiment

The first and second embodiments exemplify a configuration that a parameter groups P is specified based only on an image characteristic value Ng of a particular image Gs. The third embodiment is configured so that each parameter group P is retrieved by referring to another index in addition to the image characteristic value Ng. The third embodiment will be described below based on the same configuration as the first embodiment, which is applicable also to each of the exemplary embodiments described in the second embodiment. Components of the stereoscopic image generation device D in the third embodiment, which are common to the first embodiment, will be denoted with common reference symbols. Detailed description of such common components will be omitted herefrom where appropriate.

In this embodiment, a series of original images Ga forming one content item are divided into plural groups, as shown in FIG. 17. More specifically, a content item such as a cinema is grouped into scenes of the cinema. While sequentially reproducing plural original images Ga arranged in a time line, as shown in FIG. 17, time points when the content of the cinema greatly changes are specified. The content item is divided into segments by the time points regarded as boundaries, and the segments each are taken as a "unit segment". For example, if a difference between image characteristic values Ng of two successive original images Ga exceeds a predetermined threshold (e.g., when the content greatly changes between these images), a break between the two successive original images is selected as a boundary between unit segments. Otherwise, if the difference between image characteristic values Ng of two successive original images Ga which are successive in the time line is lower than the predetermined threshold, the original images are determined to belong to one identical unit segment. As shown in FIG. 17, each of the groups which respectively corresponds to scenes are specified as a set of a predetermined number of unit segments (e.g., a set of "four" unit segments), as shown in FIG. 17. Each group is assigned with an identifier (hereinafter a "group identifier").

Figures 18, 19:
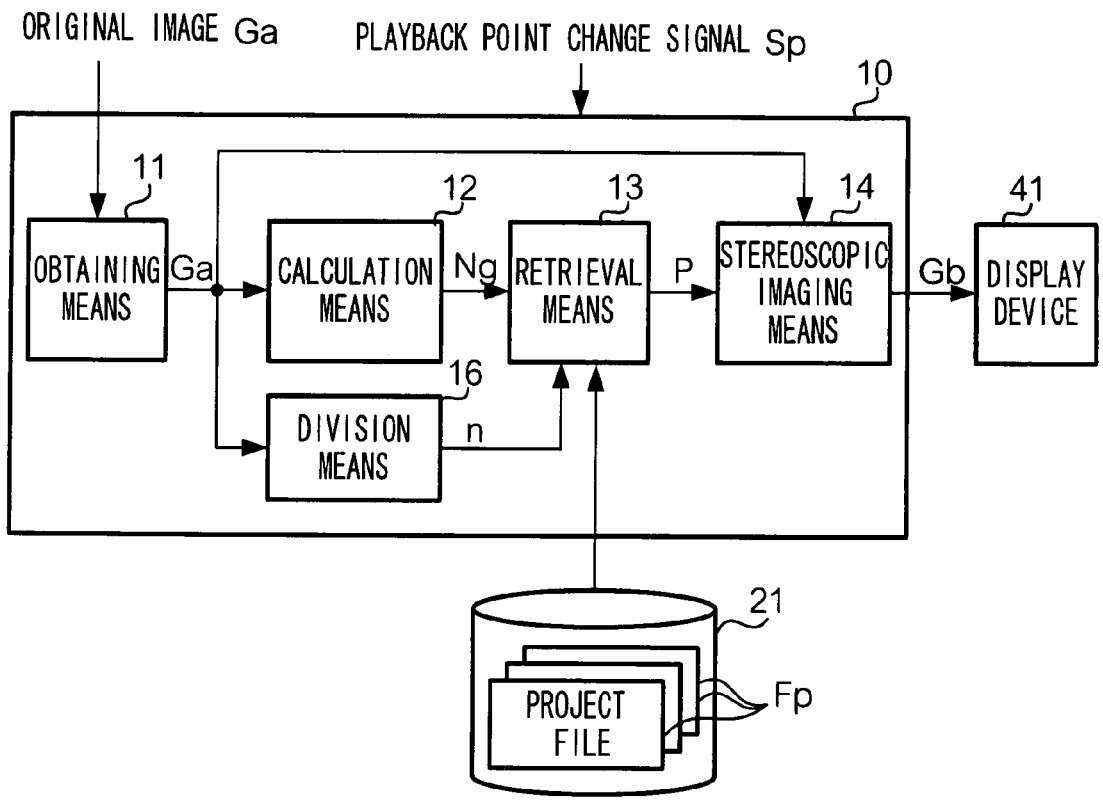
FIG. 18 is a table showing the content of a project file according to the third embodiment.
FIG. 19 is a block diagram showing another functional configuration of the controller.

FIG. 18 shows a content of a project file Fp according to this embodiment. As shown in the figure, the project file Fp includes plural records R which are respectively associated with different groups. Each record R includes identifiers, values, and parameter groups associated with each other, which are: a group identifier corresponding to the record R; image identifiers assigned to original images Ga belonging to the group; image characteristic values Nf calculated respectively for the original images Ga in the same manner as in the first embodiment; and parameter groups P to be used for the stereoscopic processing on the original images Ga, respectively. Therefore, if only the number of image identifiers belonging to one group is counted, the total number of original images Ga belonging to the group can be specified (hereinafter "number of grouped original images") m.

Next, FIG. 19 shows a block diagram showing a functional structure of the controller 10 according to this embodiment. The controller 10 in this embodiment functions not only as respective means shown in FIG. 7 but also as a division means for dividing a content item into plural groups. The division means 16 detects boundaries between unit segments, based on a content of each of a series of original images Ga obtained by the obtaining means 11, and divides a content item into groups, each consisting of a predetermined number of unit segments. The method for dividing a content item into groups has been described previously with reference to FIG. 17. Further, the division means 16 calculates a number m of grouped original images for each of the groups, and output the number m to the retrieval means 13. The division means 16 performs the processing as described above each time an image data set expressing an original image Ga is supplied from the obtaining means 11.

Figures 20, 21:
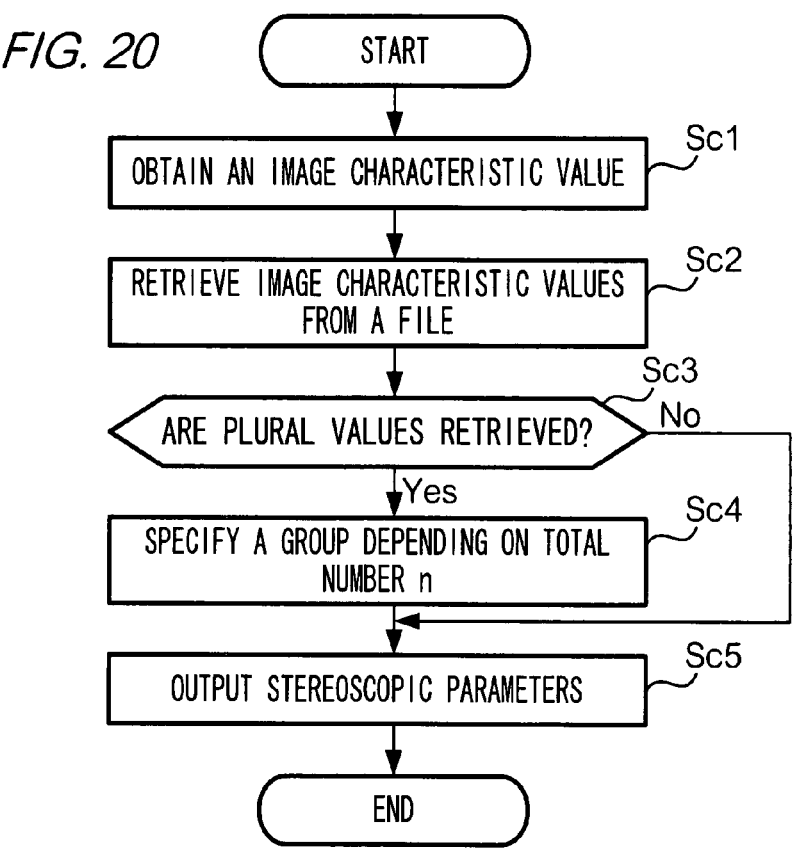
FIG. 20 is a flowchart showing another content of a processing performed by the retrieval means.
FIG. 21 is a table showing an example of a project file including plural records having equal image characteristic values.

Meanwhile, the retrieval means 13 in this embodiment specifies not only an image characteristic value Ng for a particular image Gs but also a parameter group P for each original image Ga on the basis of the number m of grouped original images calculated by the division means 16. FIG. 20 is a flowchart showing operation of the retrieval means 13. As has been described previously the operation of the first embodiment shown in FIG. 9, if only one parameter group P is retrieved for an image characteristic value Nf of a particular image Gs through the steps Sc1 and Sc2 (step Sc3: No), the retrieval means 13 outputs simply the only one parameter group P to the stereoscopic imaging means 14 (step Sc5), as in the first embodiment. Otherwise, if plural parameter groups P are retrieved for an image characteristic value Ng of a particular image Gs (step Sc3: Yes), the retrieval means 13 obtains the number m of grouped original images for a group including the particular image Gs, from the division means 16. The retrieval means 13 further retrieves a record R which includes the same number of image identifiers as the obtained number m of grouped original images (i.e., retrieves a record R for a group including a total number m of original image Ga equal to the number m calculated by the division means 16: step Sc4). The retrieval means 13 also outputs, to the stereoscopic imaging means 14, parameter groups P which are included in the record R, respectively for original images Ga.

For example, as shown in FIG. 21, there is now supposed that a content item is divided into first and second groups. The first group (assigned with a group identifier "010") includes a total of 30 original images Ga assigned with image identifiers "0053" to "0082". The second group (assigned with a group identifier "013") includes a total of 39 original images Ga assigned with image identifiers "0160" to "0198". In addition, there is also supposed a project file Fp in which a numerical value "846" is an image characteristic value Nf common to original images Ga assigned with the image identifiers "0053" and "0160". On this supposition, when the calculation means 12 calculates an image characteristic value Ng to be "845", parameter groups P associated with the image identifiers "0053" and "0160" are retrieved. Thus, only one parameter group P cannot uniquely be specified. However, if the division means 16 calculates the number m of grouped original images to be "30", the retrieval means 13 can determine that the only one parameter group P to be retrieved is the former parameter group P for the first group including the total "30" of original images Ga.

Thereafter, the stereoscopic imaging means 14 operates in the same manner as in the first embodiment. However, if "Yes" is determined in the step Sc3 in FIG. 20, the retrieval means 13 cannot specify any parameter group P to be supplied to the stereoscopic imaging means 14, during a period from when the obtaining means 11 obtains a particular image Gs to when the number m of original images is fixed by obtaining a last original image Ga of the group including the particular image Gs. Therefore, the stereoscopic imaging means 14 outputs image data sets expressing original images Ga, which belong to segments equivalent to this period, directly to the display device 41 without performing the stereoscopic processing. Even in this case, such segments constitute at most one scene of the content item and therefore will not a user does not experience an excessively unnatural impression. For original images Ga belonging to a next group, optimal stereoscopic images Gb can be generated by applying stereoscopic parameters which have been properly set for the original images Ga, respectively.

D: Modifications

Various modifications can be made to each of the above embodiments. Examples of modifications will now be described below. The above first to third embodiments and the modifications described below can be appropriately combined with each other.

I Each of the above embodiments exemplifies a configuration in which original images Ga are obtained from recording media such as a DVD 301 and a video tape 302. Sources from which original images Ga are obtained are not limited to these recording media. For example, an alternative applicable configuration is that original images Ga are sequentially supplied from an image pickup device (such as a video camera) for picking up a video. Yet another applicable configuration is that original images Ga are sequentially supplied to the stereoscopic image generation device D from a server device 52 through the communication section 24. Further, a source from which project files Fp are obtained can be arbitrarily chosen. For example, project files Fp can be read not only from the recording medium 45 having a semiconductor memory but also from a portable magnetic disk. A further applicable configuration is that a user appropriately manipulates the input device 28 to create a project file Fp. Each of the above embodiments also exemplifies a configuration in which a project file Fp is obtained through a different route from a route for obtaining original images Ga. However, there is another applicable configuration in which a project file Fp for a content item is recorded together with the content item onto the same recording medium (DVD 301 or video tape 302).

II Content of the stereoscopic processing, and the content and number of stereoscopic parameters are, of course, not limited to those described in the above embodiments. That is, the stereoscopic parameters in this invention need only be applicable to the stereoscopic processing for generating stereoscopic images Gb from original images Ga. In other words, the term "stereoscopic parameters" in the invention conceptually include all available parameters that can characterize conditions of stereoscopic images (such as a depth and the like which users can experience) generated by the stereoscopic processing. The "stereoscopic imaging means" in the invention can be all available means that can generate, from original images Ga (which are typically plane images), stereoscopic images Gb from which users feel a stereoscopic effect caused by a parallax. How the stereoscopic imaging means performs processings is not specifically limited.

III Content of the project file Fp is not limited to those described in the above embodiments. For example, image identifiers shown in FIG. 5 can be appropriately omitted from the project file Fp. Although the third embodiment exemplifies a configuration of calculating the number m of grouped original images from the total number of image identifiers, an arbitrary method is available as a method for calculating the number m. For example, an available configuration is that the number m of grouped original images is calculated from the number of image characteristic values Nf or the number of parameter groups P included in one record R shown in FIG. 18. Thus, image identifiers can be appropriately omitted. Accordingly, the invention needs only to be configured so that image characteristic values Nf of original images Ga are respectively associated with groups of stereoscopic parameters for the original images Ga. How the image characteristic values and the stereoscopic parameters are stored is not specifically limited.

For example, in the first exemplary embodiment according to the second embodiment, an original image Ga is divided into predetermined areas, and an image characteristic value N is calculated for each area. For example, areas which respectively correspond to objects (e.g., such as a person and a flower which can be recognized as separate objects) included in an original image can be specified. An image characteristic value Nf can then be calculated for each of the areas. More specifically, parameter groups Pi can be set respectively associated with the objects Oi. If objects are extracted from an original image in this manner, stereoscopic parameters to be applied to each of the original images or objects included in the original images can be determined by comparing the parameter groups Pi in addition to parameter groups P set respectively for the original images. Any arbitrary method is available as the method for extracting objects from an original image Ga. For example, pixel groups each consisting of pixels having an equal pixel value are determined first. Pixel values are then compared between pixel groups, to determine contours of objects. Inside area of each of the contours is determined to be an area corresponding to one object.

In the project file Fp, as shown in FIG. 23, numbers assigned to image characteristic classes GN, into which image characteristic values Nf are classified in a predetermined method, can be stored in place of the image characteristic values Nf. At this time, parameter groups P can be associated with the stored numbers assigned to the image characteristic classes. In an applicable method for classifying the image characteristic classes, for example, image characteristic values Nf of "1 to 10" are classified into an image characteristic class GN numbered "1", as well as image characteristic values Nf of "11 to 20" into an image characteristic class GN numbered "1". In this case, a parameter group P to be applied to the stereoscopic processing for an original image is specified, not by comparing image characteristic values Nf but by comparing the image characteristic classes GN. Accordingly, specs of a reproduction device and the like can be prevented from causing a situation that no perfectly equal image characteristic value N can be retrieved. In addition, one identical parameter group P is set for plural original images Ga classified into one single image characteristic class GN. Therefore, the number of parameter groups P can be reduced. Accordingly, the size of the project file Fp and the processing time required for retrieval can be reduced.

IV Each of the above embodiments exemplifies a configuration that the stereoscopic image generation device D is a separate device (such as a so-called set-top box) from the reproduction devices 31 and 32 and the display device 41. Functions of the stereoscopic image generation device D can be configured to be integrated into the reproduction device 31 or 32, the display device 41, or any of other various devices. For example, a stereoscopic image generation device D having any of the same configurations as described in the above embodiments is applicable to various reproduction devices such as game devices capable of reading game software and displaying images on the display device 41, personal computers each having a built-in display device, and various display devices for use in mobile phones, television receivers, car-navigation systems, projectors, head-mount displays, etc.

What is claimed is:

1. A stereoscopic image generation device comprising:
   an obtaining device that obtains sequentially a plurality of original images arranged in a time line and forming a content item;
   a calculation device that calculates a first image characteristic value from pixel values of a plurality of pixels included in one of the plurality of original images obtained by the obtaining device;
   a storage device that stores second image characteristic values for the plurality of original images and stereoscopic parameters for generating stereoscopic images from the original images, with the second image characteristic values respectively associated with the stereoscopic parameters;
   a retrieval device that compares a first image characteristic value calculated by the calculation device from a particular original image, with each of the second image characteristic values stored in the storage device, to retrieve a stereoscopic parameter for the particular original image, based on a comparison result; and
   a stereoscopic imaging device that generates a stereoscopic image from the particular original image, based on the stereoscopic parameter retrieved by the retrieval device.

2. The stereoscopic image generation device according to claim 1, wherein
   the calculation device calculates a first image characteristic value for each of a plurality of areas, into which one of the plurality of original images is divided from pixel values of pixels belonging to corresponding one of the areas,
   the storage device stores second image characteristic values respectively for a plurality of areas, into which each of the plurality of original images forming the content item is divided, with the second image characteristic values associated with the stereoscopic parameters, and
   the retrieval device compares the first image characteristic values calculated by the calculation device with the second image characteristic values stored in the storage device, for each of the plurality of areas forming the one of the plurality of original images, to retrieve a stereoscopic parameter associated with the particular original image.

3. The stereoscopic image generation device according to claim 2, wherein the calculation device calculates, respectively for the plurality of areas into which the one of the plurality of original images is divided, numerical values each depending on pixel values of pixels belonging to a corresponding one of the areas, and calculates, as the first image characteristic values for the plurality of areas, relative values expressing the numerical values for the plurality of areas in relation to each other, respectively.

4. The stereoscopic image generation device according to claim 3, wherein if a playback point for the content item is changed, the retrieval device then regards, as the particular image, one of the plurality of original images which corresponds to a changed playback point, and retrieves a stereoscopic parameter for the one of the plurality of original images newly regarded as the particular image.

5. The stereoscopic image generation device according to claim 2, wherein if a playback point for the content item is changed, the retrieval device then regards, as the particular image, one of the plurality of original images which corresponds to a changed playback point, and retrieves a stereoscopic parameter for the one of the plurality of original images newly regarded as the particular image.

6. The stereoscopic image generation device according to claim 1, wherein the calculation device calculates the first image characteristic value by summing up the pixel values of a plurality of pixels included in one of the plurality of original images.

7. The stereoscopic image generation device according to claim 6, wherein if a playback point for the content item is changed, the retrieval device then regards, as the particular image, one of the plurality of original images which corresponds to a changed playback point, and retrieves a stereoscopic parameter for the one of the plurality of original images newly regarded as the particular image.

8. The stereoscopic image generation device according to claim 1, wherein
   the storage device stores the stereoscopic parameters for respective ones of the plurality of original images in an order in which a plurality of original images is arranged;
   the retrieval device retrieves the stereoscopic parameter for the particular original image, and further sequentially retrieves stereoscopic parameters for successive ones of the plurality of original images which are successive to the particular original image, and
   the stereoscopic imaging device generates stereoscopic images from the successive ones of the original images, based on the stereoscopic parameters sequentially retrieved by the retrieval device.

9. The stereoscopic image generation device according to claim 8, wherein if a playback point for the content item is changed, the retrieval device then regards, as the particular image, one of the plurality of original images which corresponds to a changed playback point, and retrieves a stereoscopic parameter for the one of the plurality of original images newly regarded as the particular image.

10. The stereoscopic image generation device according to claim 1, wherein if a plurality of stereoscopic parameters respectively associated with different original images are retrieved for the first image characteristic value calculated by the calculation device from the particular original image, the retrieval device then compares each of the first image characteristic values calculated by the calculation device respectively for original images successive to the particular original image, with the second image characteristic values stored in the storage device, thereby to determine stereoscopic parameters for the particular original image and for the original images successive to the particular original image.

11. The stereoscopic image generation device according to claim 10, wherein if a plurality of stereoscopic parameters respectively associated with different original images are retrieved for the first image characteristic value calculated by the calculation device from the particular original image, the stereoscopic imaging device stops generating stereoscopic images until the stereoscopic parameters for the particular original image and for the original images successive to the particular original image are determined by the retrieval device.

12. The stereoscopic image generation device according to claim 1, wherein if a playback point for the content item is changed, the retrieval device then regards, as the particular image, one of the plurality of original images which corresponds to a changed playback point, and retrieves a stereoscopic parameter for the one of the plurality of original images newly regarded as the particular image.

13. The stereoscopic image generation device according to claim 1, further comprising a division device that divides the plurality of original images obtained by the obtaining device into a plurality of groups, wherein the storage device stores a plurality of records divided into a plurality of groups, the plurality of records respectively including second image characteristic values and stereoscopic parameters for corresponding ones of the plurality of original images, and if a plurality of stereoscopic parameters respectively associated with different original images are retrieved for the first image characteristic value calculated by the calculation device from the particular original image, the retrieval device compares a total number of original images in one of the groups divided by the obtaining device, to which the particular original image belongs, with a total number of original images associated with each of the groups of the records stored in the storage device, thereby to retrieve stereoscopic parameters associated with one of the groups to which the particular original image belongs, based on a comparison result.

14. A non-transitory storing medium that stores a program for causing a computer to execute:

an obtaining processing of obtaining sequentially a plurality of original images arranged in a time line and forming a content item;

a calculating processing of calculating a first image characteristic value from pixel values of a plurality of pixels included in one of the plurality of original images obtained by the obtaining processing;

a retrieval processing of retrieving a stereoscopic parameter associated with the first image characteristic value calculated by the calculating processing, from a storage means that stores second image characteristic values for the plurality of original images and stereoscopic parameters for generating stereoscopic images from the plurality of original images, with the second image characteristic values respectively associated with the stereoscopic parameters; and a stereoscopic processing of generating a stereoscopic image from a particular original image, based on the stereoscopic parameter retrieved by the retrieval processing.

* * * * *